United States Patent
Nishikawa et al.

[11] Patent Number: 6,053,270
[45] Date of Patent: Apr. 25, 2000

[54] STEERING ANGLE CORRECTING SYSTEM IN VEHICLE

[75] Inventors: Masao Nishikawa; Shinnosuke Ishida; Kenshirou Hashimoto, all of Saitama, Japan

[73] Assignee: Honda Giken Kogyo Kabushiki Kaisha, Tokyo, Japan

[21] Appl. No.: 08/743,423

[22] Filed: Nov. 1, 1996

[30] Foreign Application Priority Data

Nov. 2, 1995 [JP] Japan .................................. 7-310070
Dec. 11, 1995 [JP] Japan .................................. 7-321917

[51] Int. Cl.⁷ .................................................. B62D 5/04
[52] U.S. Cl. ........................................ 180/168; 701/41
[58] Field of Search ............................ 180/167, 168, 180/169, 421, 422; 701/23, 26, 28, 41

[56] References Cited

U.S. PATENT DOCUMENTS

| | | | |
|---|---|---|---|
| 3,871,468 | 3/1975 | Miura | 180/79 |
| 4,310,063 | 1/1982 | Nishikawa | 180/143 |
| 5,350,912 | 9/1994 | Ishida | 250/202 |
| 5,485,892 | 1/1996 | Fujita | 180/167 |
| 5,530,420 | 6/1996 | Tsuchiya et al. | 180/167 |
| 5,717,590 | 2/1998 | Milhalko | 180/446 |
| 5,765,116 | 6/1998 | Wilson-Jones et al. | 180/168 |

FOREIGN PATENT DOCUMENTS 43 32 836 C1  9/1994  Germany .

OTHER PUBLICATIONS

European Search Report.

Patent Abstract of JP 05112248.

Primary Examiner—Anne Marie Boehler
Attorney, Agent, or Firm—Lyon & Lyon LLP

[57] ABSTRACT

In a steering angle correcting system, a steering amount required to maintain a positional relationship of a subject vehicle to a road lane ahead of the subject vehicle is calculated in a steering amount calculating device based on outputs from a first detecting device for detecting the state of a lane of a road ahead of the vehicle or which the vehicle is traveling, and a second detecting device for detecting a current positional relationship of the subject vehicle to the road lane. A steering device is driven by a driving device mounted between a grasping portion of a steering wheel and the steering device so as to decrease the difference between a steering amount detected by a steering amount detecting device and a steering amount calculated in the steering amount calculating device. Whenever a driver's intention and the determination by the system are different from each other, a driver can operate the steering wheel to intervene in the steering. In addition, the driver can immediately intervene in the steering at all times, while normally maintaining a cooperating relationship with the system. Thus, the steering angle correcting system has a semi-automatic steering concept.

16 Claims, 22 Drawing Sheets

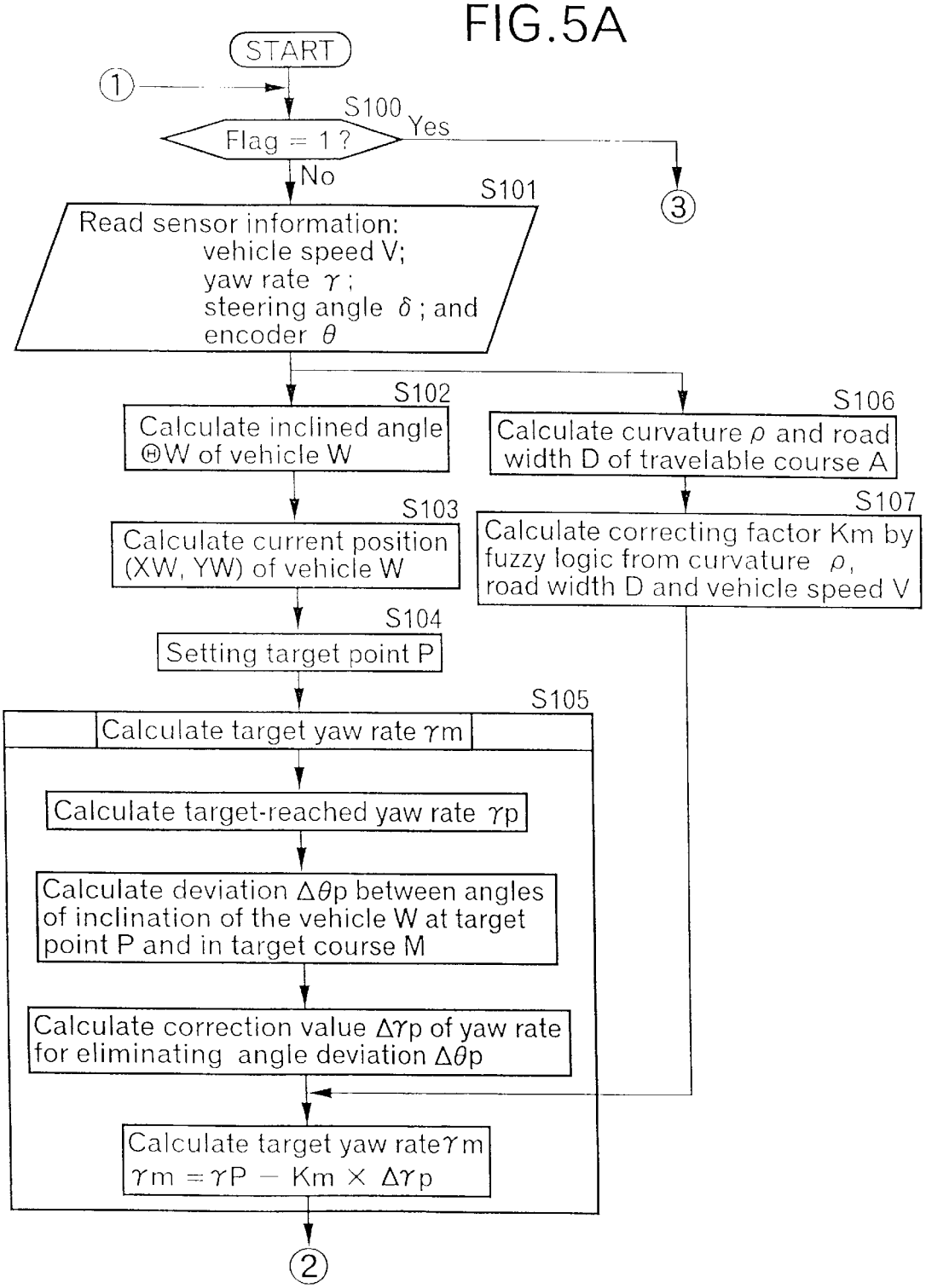

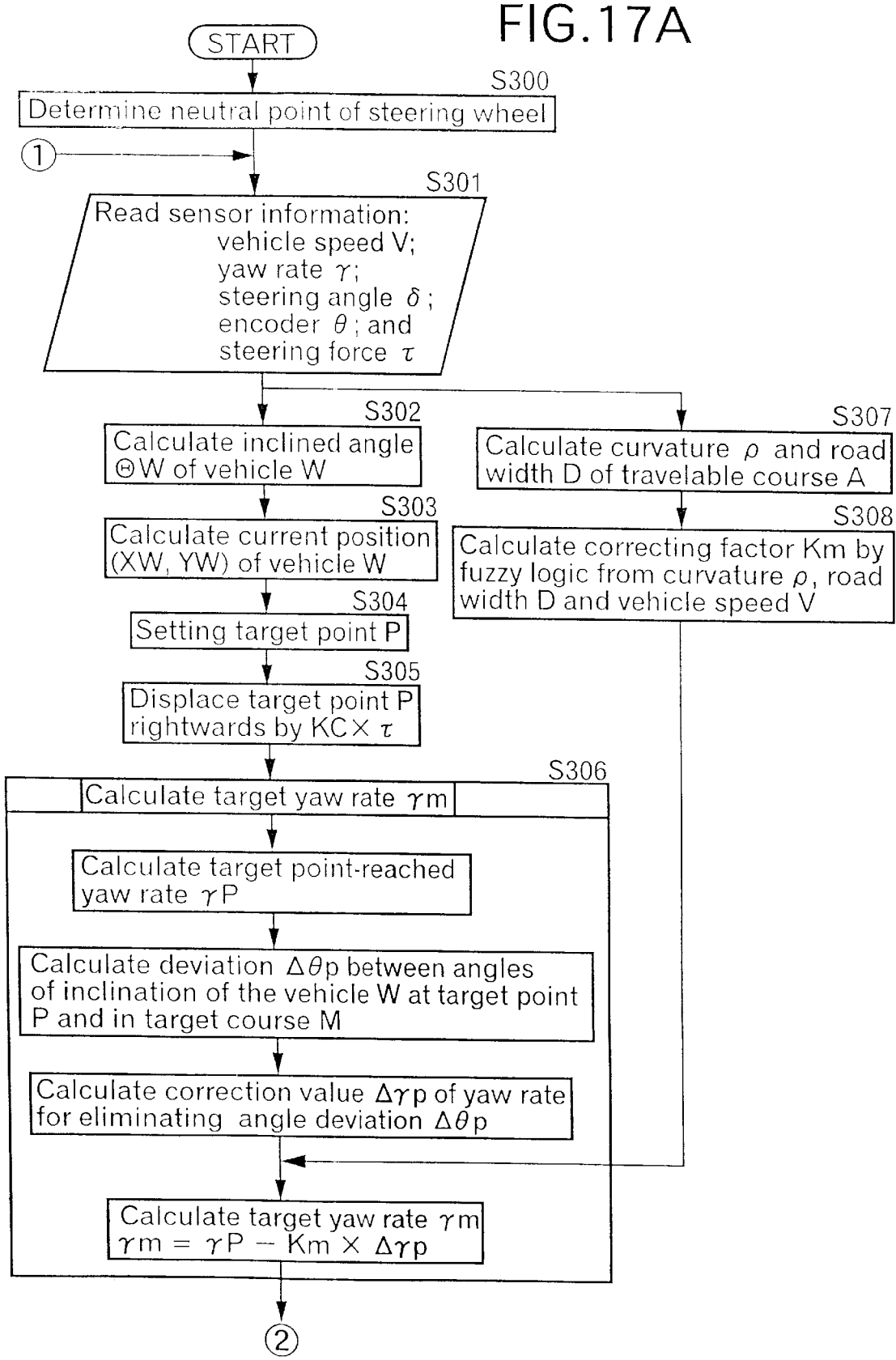

STEERING ANGLE CORRECTING SYSTEM IN VEHICLE

BACKGROUND OF THE INVENTION

1. Field of the Invention

The present invention relates to a steering angle correcting system in a vehicle.

2. Description of the Related Art

Many concepts have been proposed hitherto for correcting the steering angle applied by a driver of a vehicle in accordance with a driving situation to provide an actual steering angle. For example, a concept for correcting the steering angle applied by a vehicle's driver in accordance with a yaw rate (an angular speed about a vertical line passing through a center of gravity of a vehicle) to provide an actual steering angle has been proposed in U.S. Pat. No. 3,871,468. A concept for correcting the proportion of an actual steering angle to an input steering angle in accordance with a vehicle speed has also been proposed in U.S. Pat. No. 4,310,063. These concepts are different from an automatic operative vehicle in that the driver basically drives the vehicle.

In recent years, marvelous progress in computer technology has accelerated the development of the technique regarding the mental capacity level for utilizing various sensors for grasping a situation ahead of the vehicle in advance and utilizing the outputs from the sensors. For example, the relative positional relationship of the subject vehicle relative to a lane ahead of the subject vehicle and the degree of curvature of the lane could be known, for example, from an image analysis of an image by a CCD camera. A radar technique is capable of detecting the presence of an obstacle ahead of the subject vehicle, quickly calculating a distance from the subject vehicle to the obstacle, and deducing a possibility of collision to warn a driver of the collision by means of an alarm, or to provide an automatic braking or to take an avoiding action.

An "automatic operative vehicle" which is automatically steered by utilizing an output from this type of "foreseeing sensor" still has room for improvement in cost and reliability, but is being brought into completion as a basic technology. This concept is different from the above concepts in that the driver is not basically a person who drives the vehicle. The present assignee has also previously proposed a technique relating to such concept in U.S. Pat. No. 5,350,912.

Before the technology of the automatic operative vehicle is improved and spread, it is surmised that a man-machine cooperation system utilizing, to the maximum, outputs from the foreseeing sensors with a human taking the leadership of driving is realized. Under the cooperation system, the human approves the operation of a computer by his own intention while receiving a control output from the computer based on the sensor information, when there is a contrariety between the operation of the computer and the human's intention, the human can immediately intervene into the contrariety to realize a driving according to the his own intention. The technology already put into practical use based on this type of concept includes an auto-cruising as a control technique limited to the travel speed of the vehicle, but there is still not a technique put into practical use with regard to the control of the lateral motion of the vehicle.

The feature of the technique utilizing the foreseeing sensor is in that a situation which will occur from now on is predicted, and a correction motion is applied as required based on the result of the prediction. In this case, the phase is fast and a smooth driving is feasible, as compared with a feedback technique detecting an already produced phenomenon to apply the correcting motion.

There is also a technique described in U.S. Pat. No. 5,350,912, in which a steering angle is input to a steering system based on information from the CCD camera to cause the vehicle to travel along a lane. In this patent, a steering section is shown in an illustrative embodiment, but it is not described that the steering section is fixed to a vehicle body in what manner. If the vehicle is a usual automatic operative vehicle, it is surmised as one method that the steering section is fixed and the steering system is driven directly. In a system in which the steering section is fixed to the vehicle body in the above manner, it is a matter of course that a reaction force during steering of the steering section is borne by the vehicle body.

It is believed that a steering wheel for steering by a human is of course mounted, although not being clearly shown in the known technique (U.S. Pat. No. 5,350,912). In this case, during automatic operation by the system, the steering wheel is moved at all times in a clockwise or counterclockwise direction in response to a control output, and if the driver desires to give his intention, an interruption steering can be achieved by directly turning the steering wheel.

When the interruption steering is conducted, the system acts against the driver's intention at the beginning and hence, it is undesirable that the steering force is heavy. When the driver applies the interruption, an inertial force of a driving motor and an internal friction force in a reducer placed for the purpose of increasing the motor output become resistances. The simplest technique for decreasing these resistances is to specially prepare a clutch for disconnecting the driving motor from the system by sensing the intervention of the human by any sensor. However, with regard to the sensor for sensing the intervention of the human and the disconnecting clutch, no small-sized and inexpensive sensor and clutch are yet developed technically.

When a steering mechanism drives the steering system directly, a rotative torque and rotational speed borne by the steering mechanism are necessarily increased in order to prevent the vehicle from departing from a lane. Consequently, the driving motor is large-sized, but in a usual design of the steering system, it may be very difficult in many cases to prepare a space for placement of such a large-sized device. If a technique in which a small energy need only be required to correct the steering angle can be proposed herein, it is possible to easily provide a steering angle correcting system without making a large change in layout of the existing steering system.

SUMMARY OF THE INVENTION

Accordingly, it is a first object of the present invention to provide a steering angle correcting system in a vehicle, which has a semi-automatic steering concept and includes a man-machine interface in such a manner that a driver normally maintains a cooperating relationship to the system, and whenever a driver's intention and the determination by the system are different from each other, the driver can drive the vehicle, i.e., to provide a simple system in which an automatic steering and a manual steering can be reconciled.

To achieve the above first object, according to the present invention, there is provided a steering angle correcting system in a vehicle, comprising: a first detecting means for detecting a state of a lane of a road ahead of the vehicle on which the vehicle is traveling; a second detecting means for detecting a relationship of a current position of the subject vehicle to the road lane of the subject vehicle; a steering amount calculating means for calculating a steering amount required to maintain the relationship of the current position of the subject vehicle to the road lane ahead of the subject vehicle from outputs from the first and second detecting means; a steering amount detecting means for detecting a current steering amount; and a driving means for driving a steering device such as to decrease the difference between a steering amount calculated in the steering amount calculating means and a steering amount detected by the steering amount detecting means, the driving means being mounted between a grasping portion of a steering wheel and the steering device.

With such arrangement, whenever the driver's intention and the determination by the system are different from each other, the driver can operate the steering wheel to intervene in the steering. The driver can immediately intervene in the steering at all times, while normally maintaining the cooperating relationship to the system. Thus, the steering angle correcting system has a semi-automatic steering concept.

It is a second object of the present invention to provide a steering angle correcting system in a vehicle, wherein the energy required for automatic driving is decreased as compared with that in the known system and moreover, the man-machine cooperation can be further enhanced by promoting the driver's general operation.

To achieve such second object, according to the present invention, there is provided a steering angle correcting system in a vehicle, comprising: a first detecting means for detecting a state of a lane of a road ahead of the vehicle or which the vehicle is traveling; a second detecting means for detecting a relationship of a current position of the subject vehicle to the road lane of the subject vehicle; a steering amount calculating means for calculating a steering amount required to maintain the relationship of the current position of the subject vehicle to the road lane ahead of the subject vehicle from outputs from the first and second detecting means; a steering amount detecting means for detecting a Current steering amount; a driving means mounted between a vehicle body and a steering device for driving the steering device such as to decrease the difference between a steering amount calculated in the steering amount calculating means and a steering amount detected by the steering amount detecting means; and a relative angle changing means capable of changing the relative angle of a grasping portion of a steering wheel relative to the steering device.

With such arrangement, most of an energy required for correcting the steering angle can be borne by the driving means mounted between the vehicle body and the steering device to decrease the energy exhibited by the relative angle changing means mounted in a steering system to correct the steering angle. Thus, it is unnecessary to make a large change in layout of the existing steering system. Moreover, when the system conducts a very small correction, the driver's general operation can be promoted by matching the direction of the correcting operation with the direction of the driver's general operation, thereby further enhancing the man-machine cooperation.

The above and other objects, features and advantages of the invention will become apparent from the following description of preferred embodiments taken in conjunction with the accompanying drawings.

BRIEF DESCRIPTION OF THE DRAWINGS

FIGS. 5A and 5B show a flow chart illustrating a processing program for a steering angle correcting control;

FIGS. 17A and 17B show a flow chart illustrating a processing program for a steering angle correcting control according to a fifth embodiment of the invention;

DETAILED DESCRIPTION OF THE PREFERRED EMBODIMENTS

The present invention will now be described by way of preferred embodiments with reference to the accompanying drawings.

Figure 1:
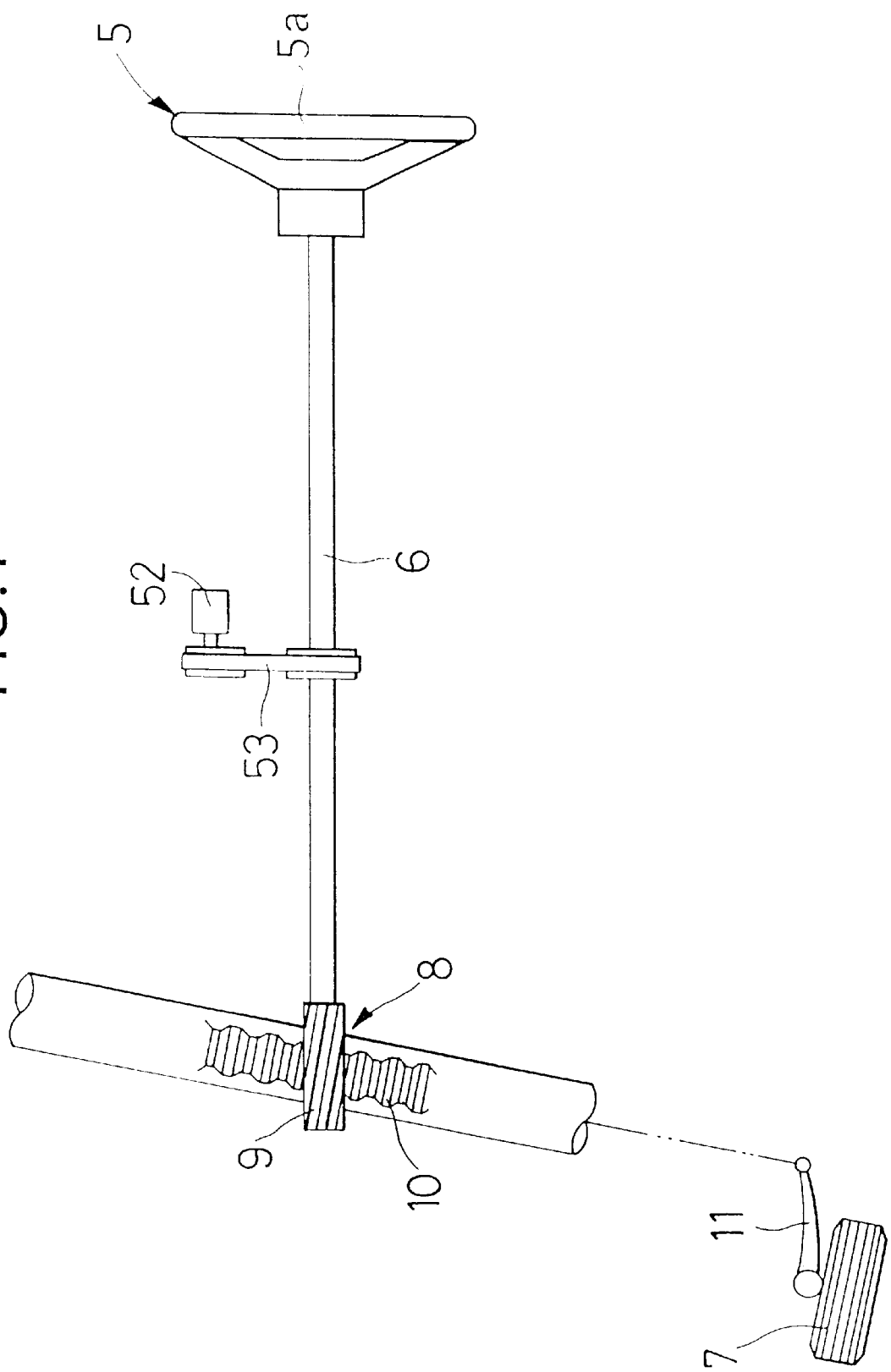
FIG. 1 is a plan view illustrating the entire arrangement of a steering system including a steering angle correcting system according to a first embodiment of the invention.

FIGS. 1 to 6 show a first embodiment of the present invention. Referring first to FIG. 1, a rotational motion of a column 6 rotated in response to the operation of a steering wheel 5 is converted into a turning motion of a front wheel 7 which is a wheel to be steered, by a steering device 8. The steering wheel 8 is constructed as a rack and pinion type by a pinion 9 provided at a front end of the column 6 and a rack 10 meshed with the pinion 9. The rack 10 is connected at its opposite ends to the left and right front wheels 7 through tie rods 11. Thus, the rack 10 can be driven vertically as viewed in FIG. 1 by rotation of the pinion 9, and the front wheels can be turned about their turning axes in response to the operation of the rack 10, thereby providing a desired steering.

Figure 2:
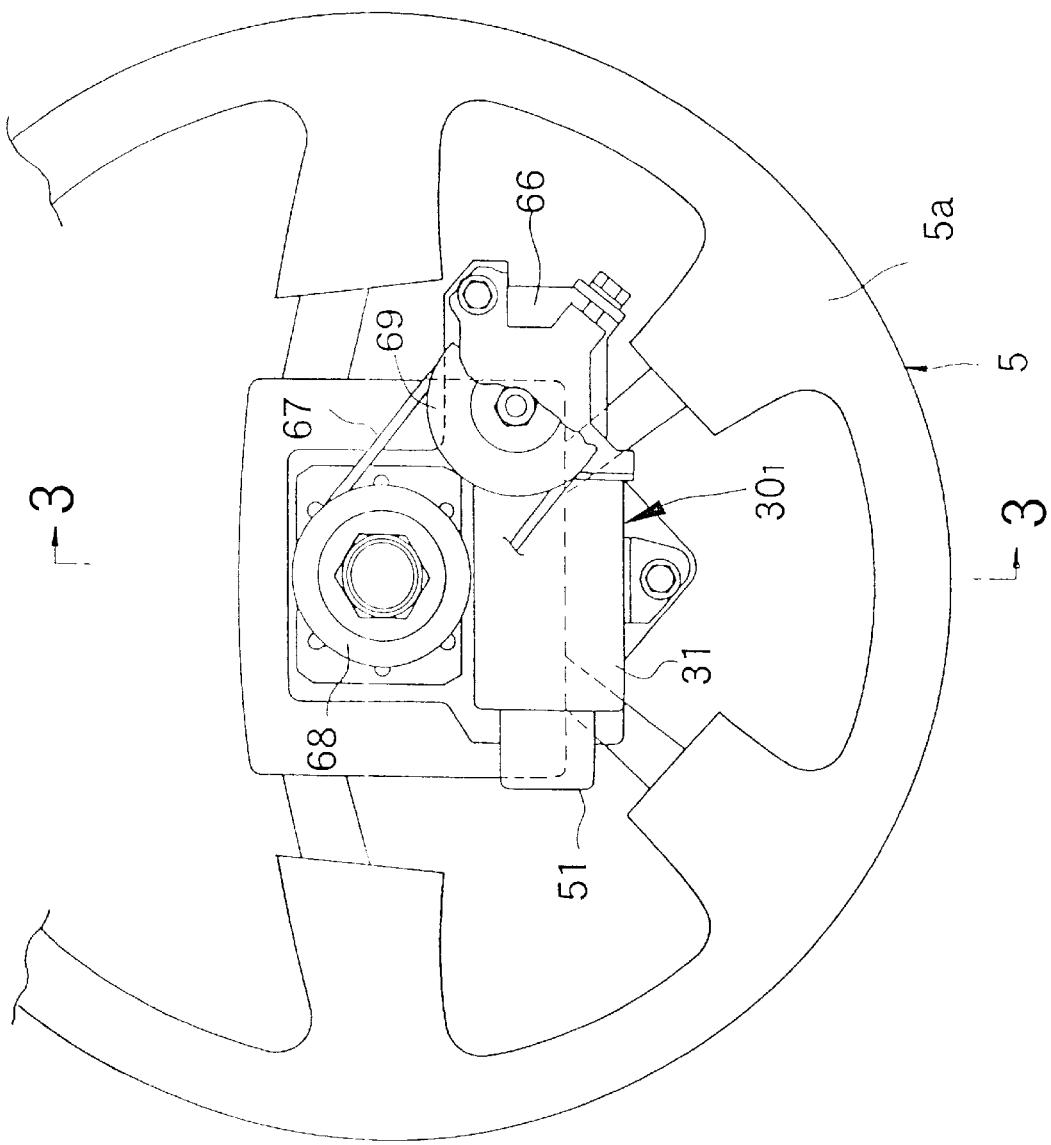
FIG. 2 is a front view of a steering wheel with a portion thereof omitted.
Figure 3:
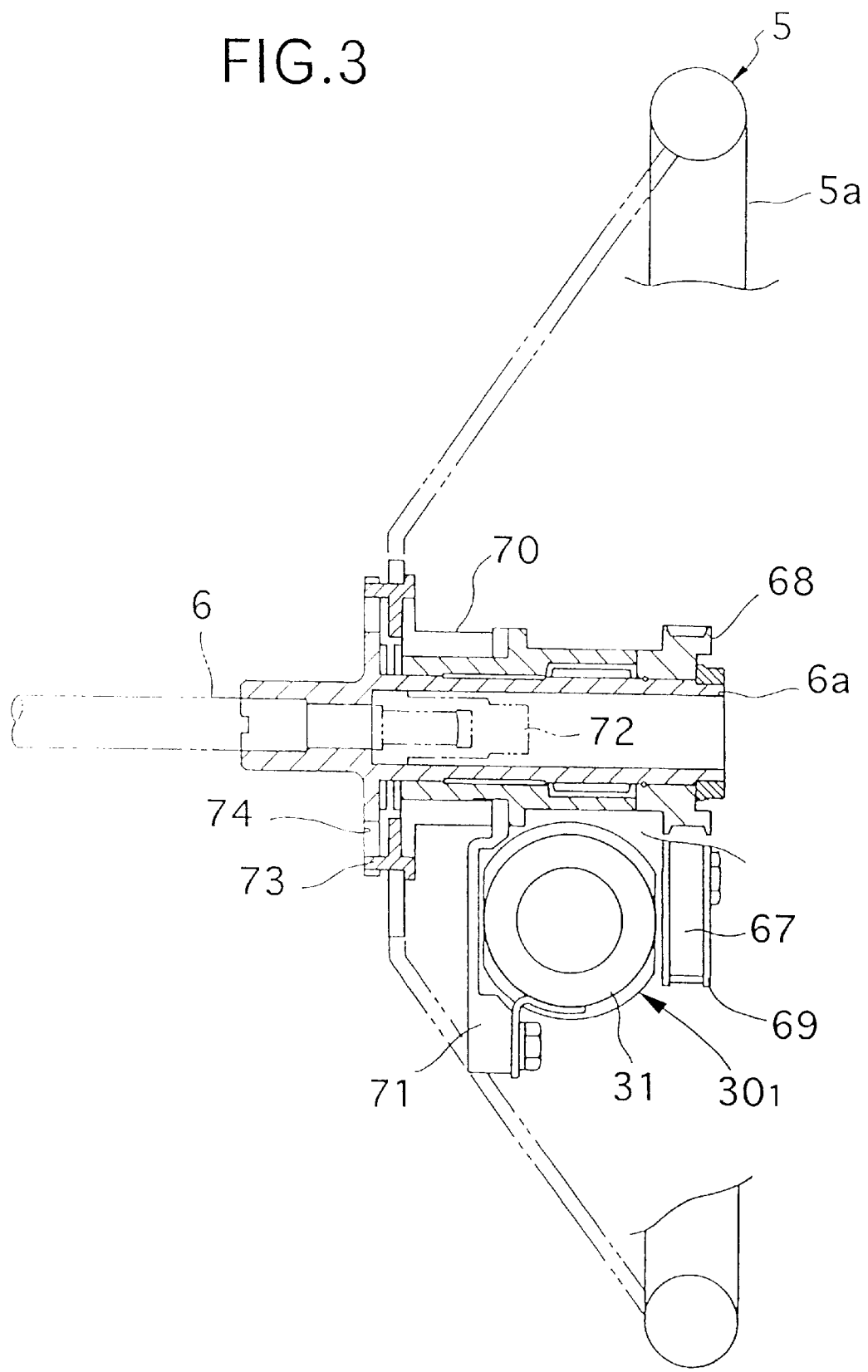
FIG. 3 is a sectional view taken along the line 3—3 in FIG. 2.

Referring to FIGS. 2 and 3, a steering mechanism $30_1$ as a driving means for driving the steering device 8 is accommodated within a steering wheel 5 having a ring-like grasping portion 5a. The steering mechanism $30_1$ has servo motor 31 and a worm gear type reducer 66 for increasing the output torque from the servo motor 31. When the servo motor 31 is energized and operated, a relative motion is produced between the steering wheel 5 and the column 6, so that the column 6 is driven in a clockwise or counterclockwise direction relative to the steeling wheel 5 depending upon the direction and magnitude of such relative motion.

On the other hand, the reducer 66 has a nature that it self-locks when the driver intends to drive the column 6 by a physical force from the steering wheel 5. The steering mechanism $30_1$ including such an irreversible transmitting mechanism ensures that even if an abnormality such as a breakage should be produced in an electric system, it is possible for a driver to steer the vehicle by operating the steering wheel 5. In addition, even when an automatic driving device stops the control, as described hereinafter, an automatic steering can be automatically switched over to a manual steering, and a more natural feeling during the switching time can be insured.

The characteristic of the reducer 66 ensures that if a switch which will be described hereinafter is turned off to stop a steering angle correcting control when the driver desires the driving only by his intention, the steering wheel 5 and the column 6 are interconnected rigidly. At this time, it is possible to steer the vehicle with a steering feeling similar to that provided in the conventional vehicle having no steering angle correcting device.

A driving pulley 69 is mounted on an output shaft of the reducer 66, and a toothed rubber belt 67 is reeved around a follower pulley 68 mechanically coupled to the column 6 and the driving pulley 69, so that an output from the reducer 66 is transmitted to the column 6. In such arrangement, if the driver operates the steering wheel 5, the movement of the steering wheel 5 is directly transmitted to the column 6 and hence, the servo motor 31 of the steering mechanism $30_1$ may be operated in an amount corresponding to a difference between a required steering angle and an angle input to the steering wheel 5. This advantage will be described in detail hereinafter.

An encoder 51 is mounted to the servo motor 31 for detecting the direction and amount of operation of the servo motor 31. To monitor whether a desired steering angle has been obtained, an amount of rotating displacement transmitted from an intermediate portion of the column 6 through a belt transmitting means 53 is detected by an encoder 52, as shown in FIG. 1.

Further, in order to detect a steering torque applied to the steering wheel 5, a torque sensor 70 is disposed coaxially with the column 6 and mechanically coupled to the steering wheel 5, as shown in FIG. 3. The servo motor 31 is fixedly supported on a base plate 71, and the torque sensor 70 is coupled at its right end as viewed in FIG. 3 to the base plate 71 by a plurality of bolts. As a result, the servo motor 31 is fixed to the steering wheel 5.

The follower pulley 68 is fixed to a column pipe 6a by an appropriate technique such as a key. The column pipe 6a is coaxially and firmly fixed to the column 6 by a special nut 72 through a coupling such as a serration. In this manner, the steering mechanism $30_1$ including the servo motor 31 is fixed to the steering wheel 5 and not fixed to the vehicle body.

In order to limit the relative rotational motion amount between the column pipe 6a and thus the column 6 and the steering wheel 5, a tongue 73 extending forward from the side of the steering wheel 5 is inserted into a slit 74 provided in the column pipe 6a. The steering wheel 5 and the column pipe 6a are rotatable relative to each other in a range in which the tongue 73 can be moved within the slit 74. However, in a state in which the tongue 73 is in abutment against a wall of the slit 74, the steering wheel 5 and the column pipe 6a are rotated in unison with each other. Such a structure is well-known as a lost motion connection serving as a fail-safe mechanism upon a failing of power in a power-steering system.

Figure 4:
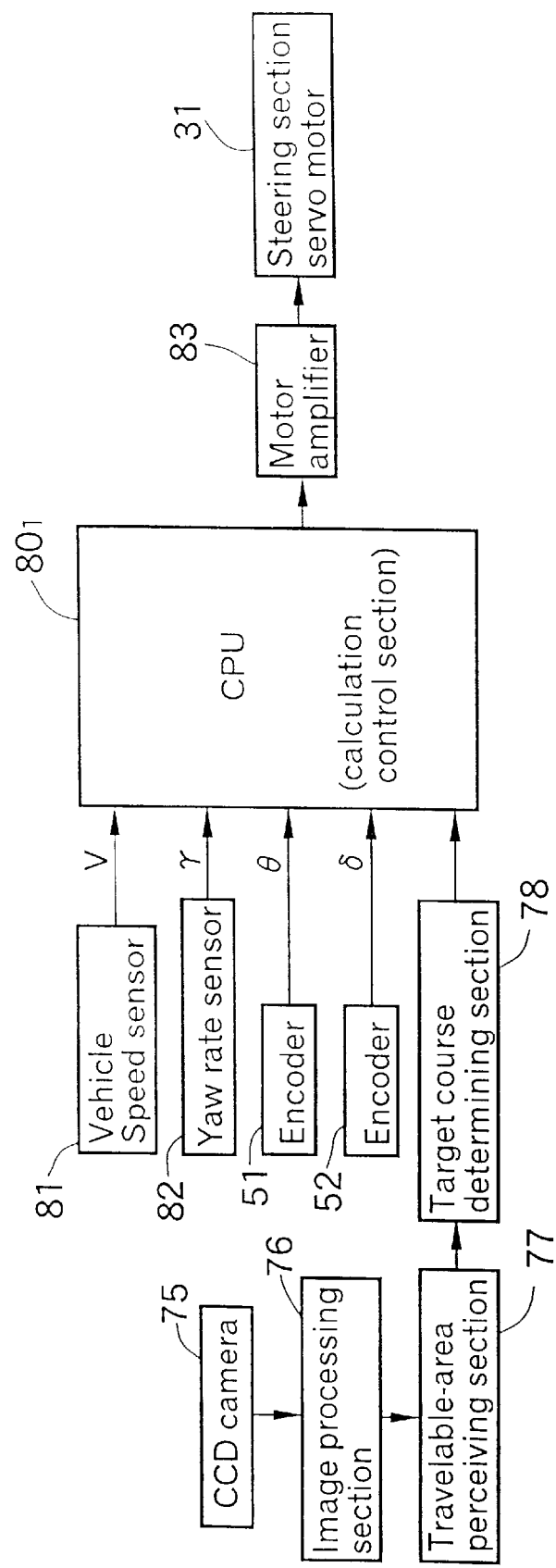
FIG. 4 is a block diagram illustrating the entire arrangement of the steering angle correcting system.

Referring to FIG. 4, a CCD camera 75 is mounted at a proper position on the vehicle for shooting a scene ahead of the vehicle in an advancing direction. The image information taken by the CCD camera 75 is subjected to a processing such as extraction of a characteristic point and a Hough conversion in an image processing section 76. A travelable area is searched in a travelable-area perceiving section 77 based on an image resulting from the image processing in the image processing section 76, and a scheme of a course along which the vehicle will now travel is determined based on a search result in a target course determining section 78. Thus, the CCD camera 75 and the image processing section 76 constitute a first detecting means for detecting a traffic lane state of a road ahead of the traveling vehicle, and the travelable-area perceiving section 77 and the target course determining section 78 constitute a second detecting means for detecting a current positional relationship of the subject vehicle to a road lane.

An output signal from the target course determining section 78 is input to a CPU $80_1$ which is a steering-amount calculating means for calculating a steering amount required for maintaining the positional relationship of the subject vehicle to the road lane ahead of the vehicle, from outputs from the first and second detecting means. The following outputs are also input to the CPU $80_1$: an output from a vehicle speed sensor 81 mounted at a proper position on a drive shaft (not shown) of the vehicle for detecting a travel speed V of the vehicle, and an output from a yaw rate sensor 82 mounted at near a central position on the vehicle for detecting a yaw rate (an angular speed about a vertical axis of a center of gravity of the vehicle) γ. A correction steering angle θ determined by the encoder 51 (FIG. 2) and an actual steering angle δ determined by an encoder 52 (FIG. 1) are also input to the CPU $80_1$.

A switch which is not shown is disposed at a proper position in the vicinity of a driver's seat for switching over the execution and non-execution of the correction of the steering angle one from another. A switching signal from the switch is also input to the CPU $80_1$.

Figure 5B:
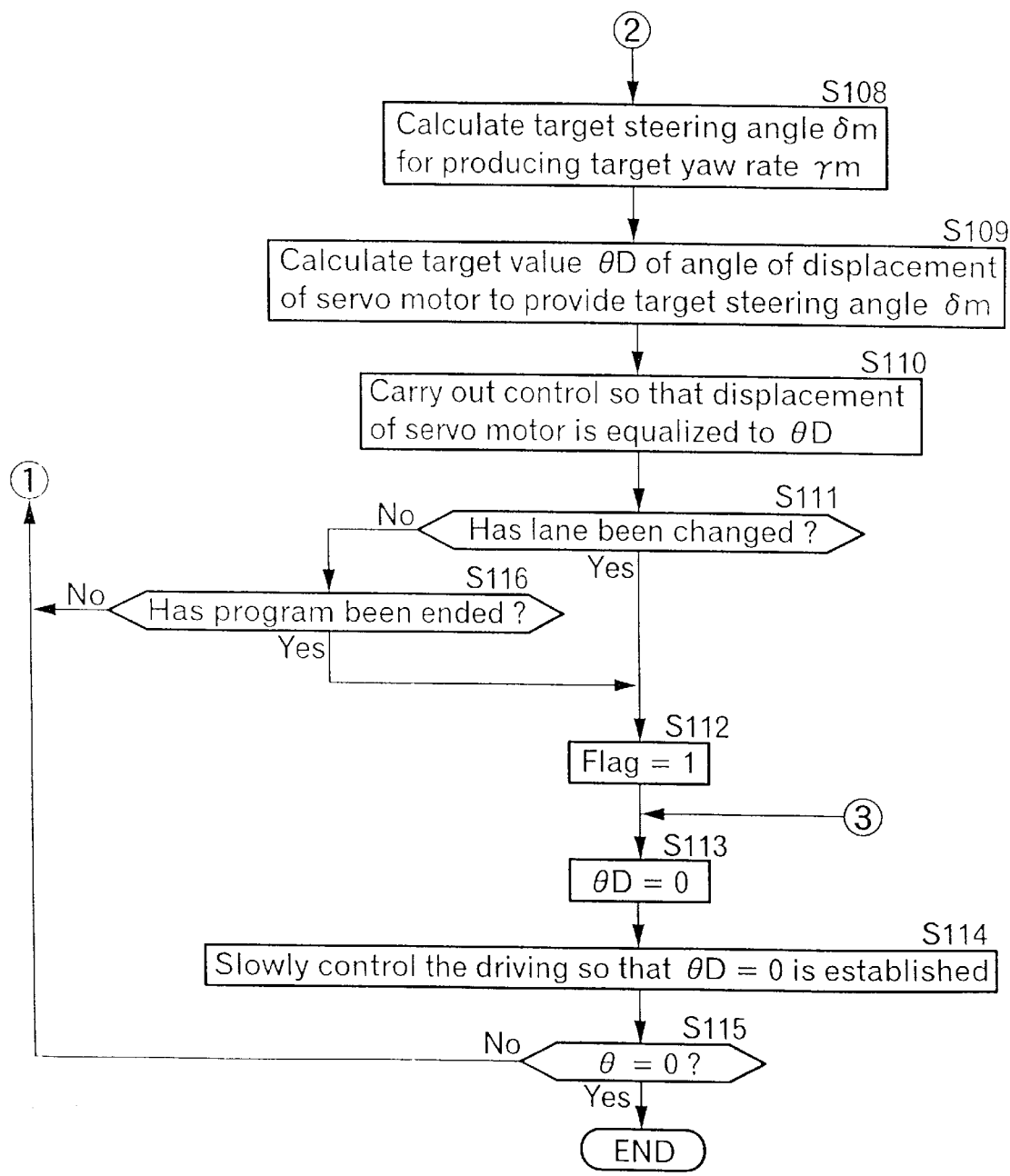

The CPU $80_1$ calculates a target steering angle θD of the servo motor 31 according to a program shown in FIGS. 5A and 5B and outputs the target steering angle θD, thereby driving the servo motor 31 through a motor amplifier 83.

In FIGS. 5A and 5B, the program is started, for example, at an interval of every 10 msec. At step S100, it is determined whether a bit of a flag has been set at "1". If the flag bit (an initial value is 0) has been set at "1", steps from step S101 to step S112 which will be described hereinafter are not carried out.

If NO in step S100, i.e., if the flag bit is "0", information from the sensors 51, 52, 81 and 82 are read at step S101, proceeding to step S102.

Figure 6:
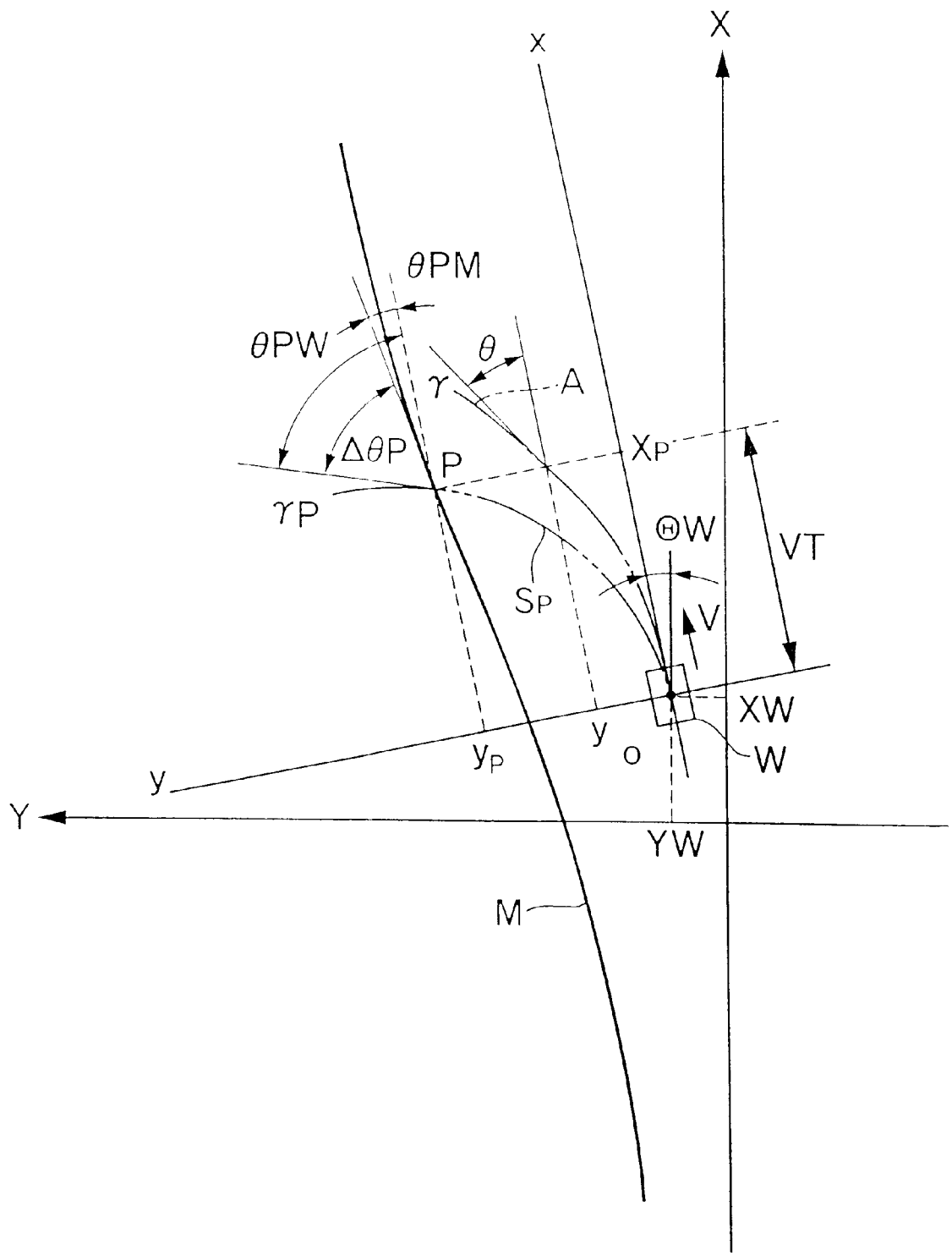
FIG. 6 is an illustration for explaining the processing in the flow chart in FIG. 5.

At step S102, an inclination angle ΘW of the subject vehicle (which is indicated by W) is calculated on coordinates shown in FIG. 6. In the coordinates, x-y relative coordinates having a vehicle position W shown as an origin o, an x-axis provided by the longitudinal direction of the vehicle W and an y-axis provided by a widthwise direction of the vehicle W are established on X-Y fixed coordinates. The target course determining section 78 perceives a travelable area A in a plane manner from a road line segment M extracted from the image information provided by the CCD camera 75, and determines a target course M as curve including an array of dots, according to a predetermined rule, for example, which determines a target course M at a center of the travelable area A.

The x-y relative coordinates and the X-Y fixed coordinates based on the vehicle W have been initially established so that they are conformed to each other during stoppage of the vehicle W. Thus, the angle $\Theta W$ of inclination of the vehicle W in the X-Y fixed coordinates can be determined by integrating the detected yaw rate $\gamma$, every time the flow chart in FIGS. 5A and 5B is started.

At subsequent step S103, coordinate components (XW, YW) of the current position of the vehicle W, i.e., the origin o of the x-y relative coordinates of the vehicle W on the X-Y fixed coordinates, and at step S104, a target point P is set. This means that the target point is set as a point on the target course M with an x-coordinate component provided by a distance $X_D$ (=VT) of movement of the vehicle W in the direction of the x-axis at a current vehicle speed V for a predetermined foreseen time T, because the target course M is represented as the array of dots in the x-y relative coordinates.

At step S105, a target yaw rate $\gamma m$ is calculated. In this calculation, the following calculations are sequentially carried out: a calculation of a target point-reached yaw rate $\gamma p$ produced during traveling of the vehicle W along a phantom course Sp until the vehicle W reaches the target point P; a calculation of an angle deviation $\Delta\theta p$ between an angle $\theta PW$ of inclination of the vehicle W at the target point P and an angle $\theta PM$ of inclination of the vehicle W in the target course M; and a yaw rate correction amount $\Delta\gamma p$ for eliminating the angle deviation $\Delta\theta p$. Further, the target yaw rate $\gamma m$ is calculated according to the following equation:

$$\gamma m = \gamma p - Km \times \Delta \gamma p$$

In the above equation, Km is a correcting factor which can be provided by interruption processing at steps S106 and S107 provided in parallel to steps S102 to S105. More specifically, at step S106, a curvature a and a road width D of the travelable course A are determined, and at step S107, a correcting factor Km is determined by a fuzzy logic from the curvature σ, the road width D and the vehicle speed V. In this case, the correcting factor Km is determined in accordance with the values such as the curvature σ and the road width D in view of the fact that it is difficult to make the vehicle converge smoothly to the target course M depending upon the curvature and the like of the travel course.

At step S108 subsequent to step S105, a target steering angle $\delta m$ of the front wheel 7 required for producing the target yaw rate $\gamma m$ is calculated using a proper equation illustrating the relationship between the yaw rate and the steering angle. At step S109, a target value $\theta D$ of an angle of displacement of the servo motor 31 for equalizing the steering angle of the front wheel 7 to the target steering angle $\delta m$ is calculated. Further, at step S110, a feed-back control is carried out so that the displacement of the servo motor 31 is equalized to the target value $\theta D$.

At step S111, it is determined whether the road lane has been changed. In other words, it is determined from an output from the target course determining section 78 whether the vehicle has left the present lane and has passed to an adjacent lane as a result of the steering performed by the driver. When the change in lane has been confirmed by the determination result, the control at from step S101 to step S110 is discontinued, as will be described hereinafter.

When the change in lane has been confirmed at step S111, it can be presumed that the servo motor 31 has been moved to a limit position of the lost motion mechanism and in other words, to a position in which the tongue 73 abuts against the wall of the slit 74. In order to stop the control after returning the servo motor 31 to an original position, a restoring control by way of steps S112 to S115 is carried out.

First, at step S112, the bit of the flag is set at "1", and at step S113, the target value $\theta D$ of the displacement angle of the servo motor 31 is set at "0". Further, at step s114, the servo motor 31 is operated at a low speed so that $\theta D=0$ is established. Thereafter, at step S115, it is confirmed that the angle $\theta$ detected by the encoder 51 becomes "0", thereby finishing the program control. Before $\theta D=0$ is reached, a restoring motion is conducted over a time of about 2 deg/sec from step S115 via step S100 back to step S113.

When the vehicle does not have such a restoring function, the steering wheel is not returned to a straight position during straight advancing of the vehicle, resulting in disadvantages that an unnatural feeling is given to the driver and that when the control at steps S101 to S110 is carried out again, the servo motor 31 cannot afford to be operated in either left or right direction.

When the change in lane is not confirmed at step S111, it is determined at step S116 whether the program has been ended. If the program is not ended, the processing is returned to step S100. In other words, when the vehicle is traveling on the same lane whether or not the driver has intervened in the steering, the control at steps S101 to S110 is subsequently continued.

A point of difference between such control and a control in the technique (Japanese Patent Application Laid-open No. 5-197423 which corresponds to U.S. Pat. No. 5,350,912 mentioned above) which has been previously proposed is that in addition to the fact that the steering mechanism $30_1$ is not fixed to the vehicle body, the servo motor 31 is subjected to the feedback control so that the value $\delta$ detected by the encoder 52 is equal to the target value. The displacement angle $\theta$ of the servo motor 31 at this time (the value detected by the encoder 51) has the following relationship to the target steering angle $\delta m$:

$$\delta m = \delta H + \theta / KW$$

wherein KW is a gear ratio of the reducer 66; and $\delta H$ is an angle of the steering carried out by the intervention of the driver through the steering wheel. This steering angle being a value relative to an absolute space, and because $\delta m$ and $\theta$ can be detected directly, $\delta H$ can be detected according to the above equation.

Therefore, if there is a difference generated between the angle $\delta$ detected by the encoder 52 for detecting the output steering angle and the target steering angle $\delta m$, a value resulting from the multiplication of the difference by the gear ratio is a target value $\theta D$ of the angle of displacement of the servo motor 31. A torque TM required to be exhibited by the servo motor 31 in order to make up for the difference between the target value $\theta D$ and the angle $\theta$ of displacement of the servo motor 31 is represented by $$TM = K0 \times \{KW \times (\delta m - \delta) - \theta\}$$

wherein K0 is a gain constant, and an electric current for generating this torque TM is output from the motor amplifier 83.

As has been described above in detail, according to this embodiment, the driver need only conduct a general steering and then, a steering operation for following the lane is automatically performed, thereby providing an alleviation in fatigue of the driver. If the driver releases the steering wheel 5, the steering wheel 5 is usually rotated or raced, whereby a substantial steering is not realized, because there is no portion receiving a reaction force from a road surface from the fact that the steering mechanism $30_1$ is not fixed to the vehicle body, as described above.

Therefore, there are the following advantages: it can be necessarily realized to compel the driver to always grasp the steering wheel 5, and a slow operational speed of the servo motor 31 suffices to conduct a general steering action by the driver. Thus, the present invention can be realized even with a small-sized and lightweight servo motor 31.

For example, suppose that the driver is driving the vehicle along a gentle curve. In this case, the driver inputs a steering angle suitable for such curve and hence, the steering angle to be corrected by the system may be an amount such that the vehicle cannot follow the lane by an amount of steering by the driver. Even if the curvature of the road is changed, the driver inputs a steering angle corresponding to an occasional change and hence, the steering angle to be corrected by the servo motor 31 may be a small amount.

If the steering angle input by the driver is remarkably excessively deficient relative to the curvature of the road, the vehicle, of course, starts to depart from the lane and hence, the driver will know that the steering angle input by himself is deficient or excessive.

In this embodiment, however, the difference between the steering amount input by a human and the target steering amount in the system is not necessarily small, and it is undeniable that the capacity of the servo motor 31 is increased as compared with a fourth embodiment which will be described hereinafter. For example, if the driver is unskilled or very tired, there is a possibility that a general steering amount is an inapposite amount and hence, it is required that the servo motor 31 is designed so as to have a certain degree of capacity.

In addition, according to this embodiment, when the driver maintains the steering wheel 5 straight, for example, in a road extending substantially rectilinearly, a very small steering force is applied to the front wheel 7 by an output from the servo motor 31 based on the image information, so that the vehicle runs along the lane. However, if the vehicle is unexpectedly approaching a road having a large curvature without operating the steering wheel 5, the front wheel 7 is steered and as a result, a reaction force from the road surface is transmitted through the column 6 to the driver.

The reaction force from the road surface means an aligning torque (i.e., a torque acts to return the front wheel 7 to a straight advancing state) generated based on the geometry applied to the tire, which is well-known in this technical field. A steering torque in a direction to return the vehicle to a straight advancing state is taken in, notwithstanding that the steering wheel 5 is not operated. Thereafter, a scene ahead of the vehicle shows a behavior dependent upon the steering and hence, the driver can visually confirm that the front wheel 7 is steered. In addition to the visual confirmation, the driver can know even from a lateral acceleration that the vehicle is in a turning state.

Even when the lane-following control is being carried out, if the driver desires, for example, to avoid an obstacle, or to pass to an adjacent lane, he can override the lane-following control by only applying a required steering angle to the steering wheel 5.

At this time, a steering angle intended to overcome the driver's steering is of course output from the system, but a torque applied to the steering system is only a reaction force from the road surface. Therefore, a torque transmitted to the steering wheel 5 irrespective of the action of the servo motor 31 is only the reaction force from the road surface, leading to an advantage that it is possible to remarkably smoothly override the lane-following control, as compared with a case where the servo motor generates a reaction torque striving against a driver's intention, when the steering mechanism $30_1$ is fixed to the vehicle body.

Further, the target steering angle δm is determined so that the vehicle travels on a central portion of a lane and hence, an automatic correction is applied when departing from the lane. For example, if external disturbance due to a side wind or an unevenness of a road surface is applied to cause the vehicle to depart from a course, the correction is performed to automatically restore the vehicle to the original course and hence, the driver may scarcely do anything against the external disturbance.

If this is considered from a vehicle's locus, the departing from the course due to the external disturbance means and the return to the course is converged in the same manner as by the skilled driver, leading to a correspondingly increased stability. If this is considered from a vehicle traveling on an adjacent lane, a surrounding travel order is maintained stably and is not disturbed, which is advantageous.

Further, this embodiment has an advantage that upon the occurence of a trouble such as power failure, the steering mechanism $30_1$ is brought into a state in which it is fixed to the steering wheel 5 and hence, the automatic steering can be passed immediately to the manual steering. Even when the switch for switching whether or not the correction of the steering angle is carried out can be turned off as described above to prevent the correction of the steering angle from being carried out, so that the driver performs all the steering, the driver can enjoy a rigid steering feel similar to that in the prior art.

Even when the operation of the steering angle correcting device is stopped after completion of the lane change and the like, the automatic steering is basically shifted to the manual steering and hence, the steering feel at the shifting is natural, leading to an enhanced commercial property. Even according to a third embodiment which will be described hereinafter, this advantage can be easily achieved by additionally mounting a clutch which is adapted to be brought into an engagement upon the power failure and to be brought out of the engagement upon energization.

Further, when the vehicle passes from the current lane to an adjacent lane (changes the lane), the lane-following control is stopped and hence, it is possible to prevent the vehicle from behaving against the driver's intention to return to the original lane after passing to the adjacent lane. Moreover, when the vehicle passes from the current lane to an adjacent lane, or when the switch is operated so that the steering angle correcting device is inoperative, the operational position of the servo motor 31 is returned slowly to a neutral position. Therefore, it is possible to prevent the vehicle from traveling with the position of the steering wheel 5 remaining inclined. In the restarting, it is possible to start with a position in which the control of the servo motor 31 is prepared laterally evenly.

Figure 7:
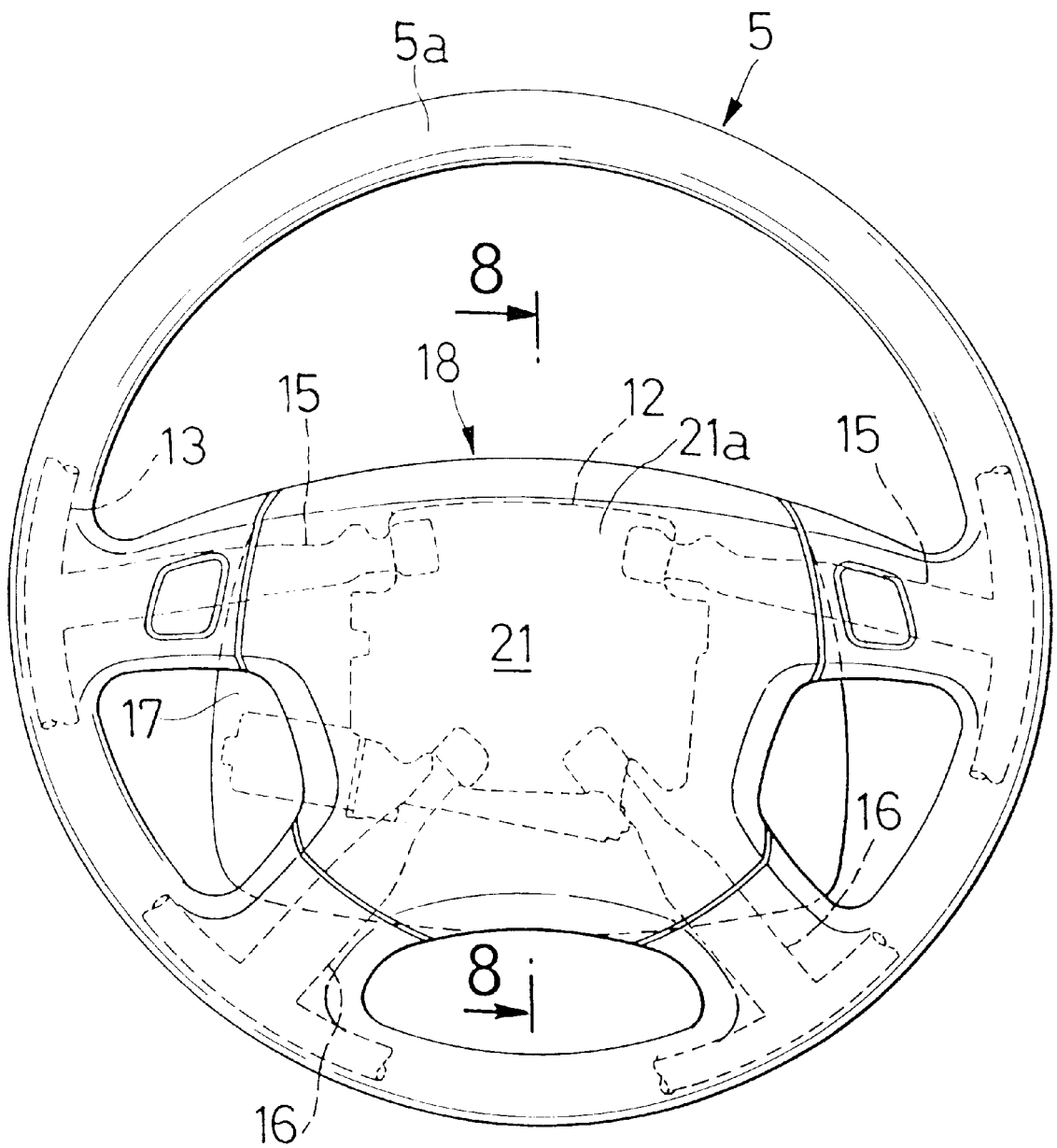
FIG. 7 is a front view of a steering wheel including a steering angle correcting system according to a second embodiment of the invention.
Figure 8:
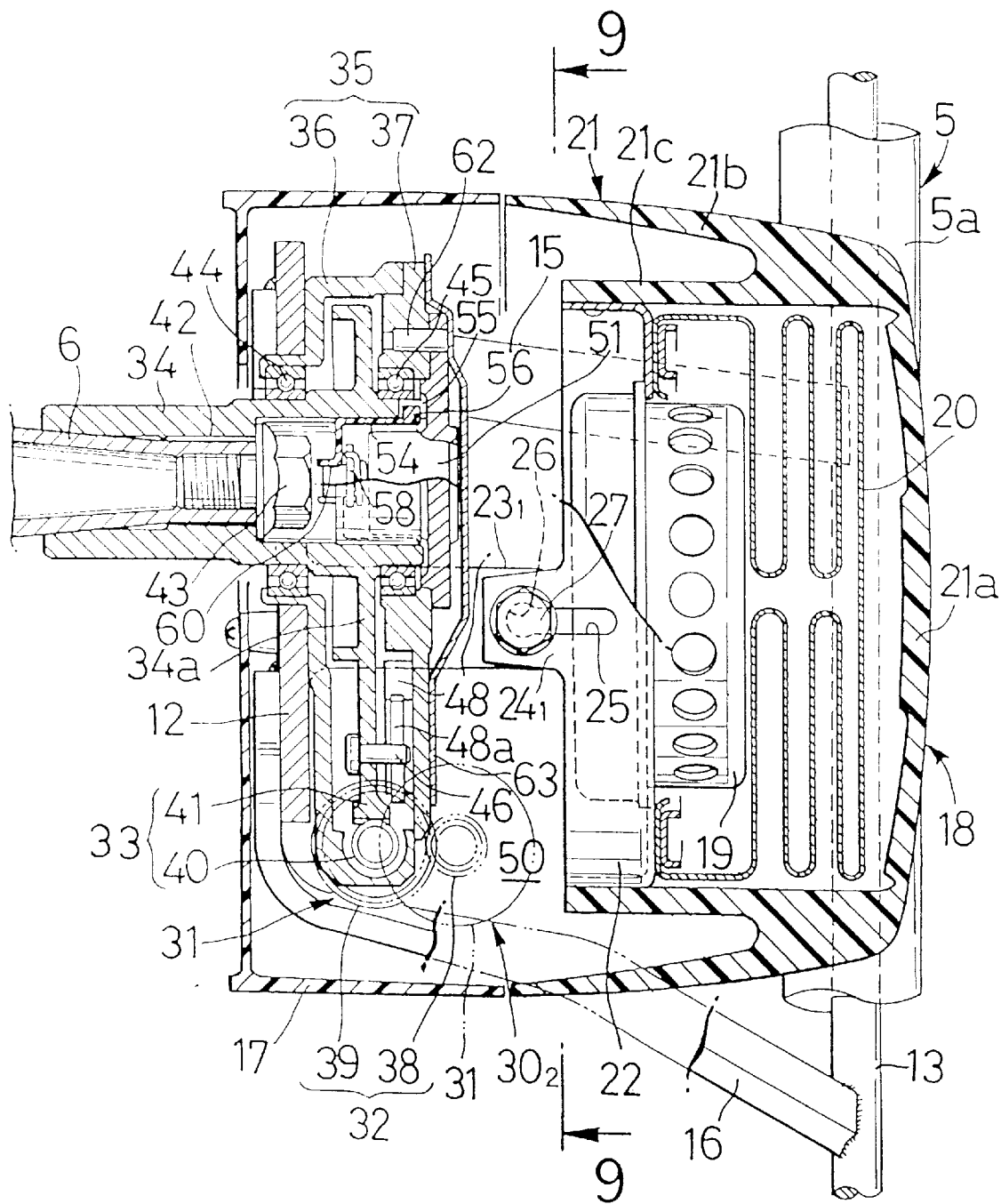
FIG. 8 is a sectional view taken along the line 8—8 in FIG. 8.
Figure 9:
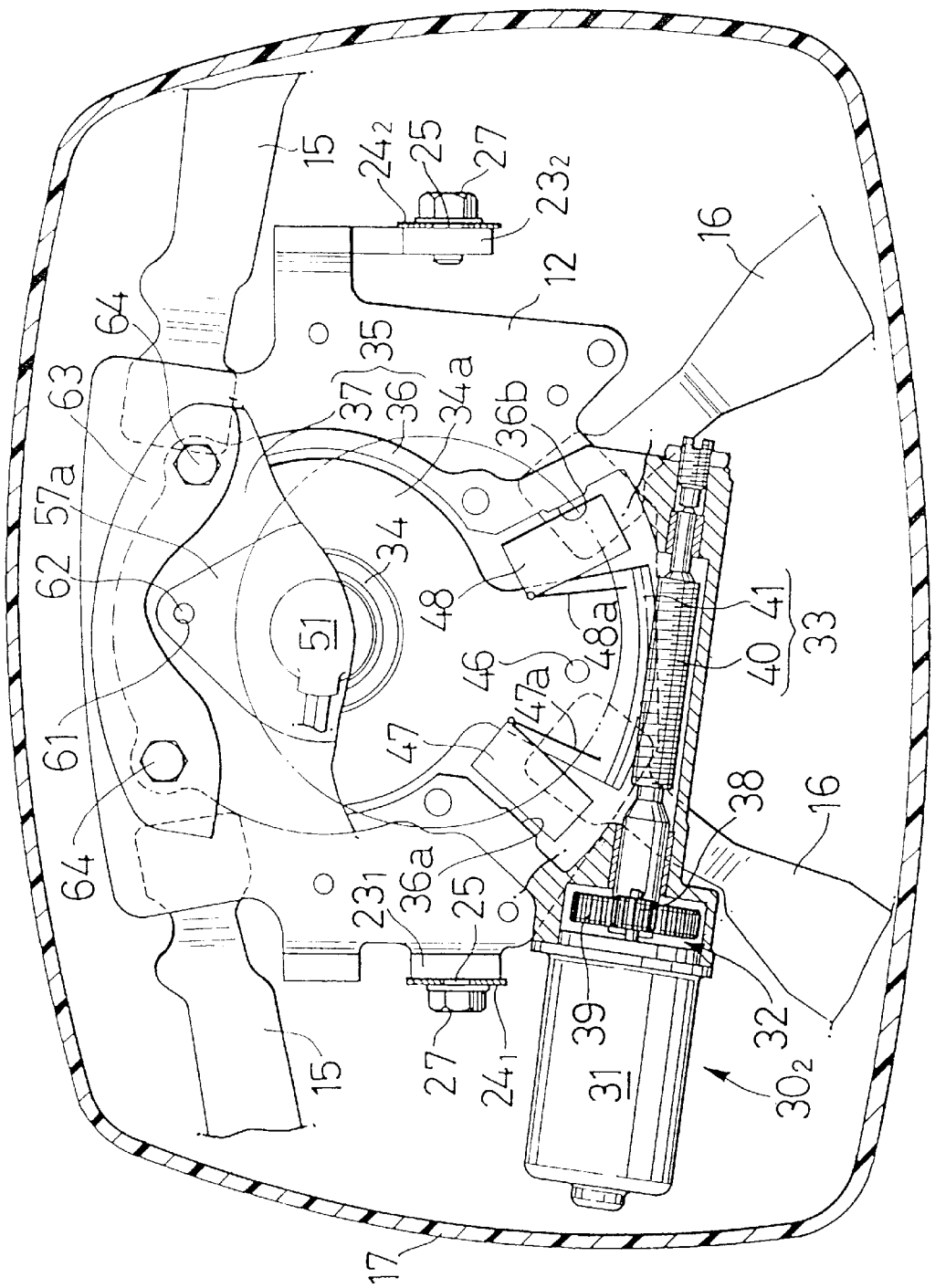
FIG. 9 is a sectional view taken along the line 9—9 in FIG. 8.

FIGS. 7 to 10 illustrate a second embodiment of the present invention. Referring first to FIGS. 7, 8 and 9, the steering wheel 5 includes a boss plate 12 relatively rotatably mounted to a rear end of the column 6 (a right end in FIG. 8), a ring-like grasping portion 5a which is disposed to surround a rearward extension of the column 6 and which has a core 13 embedded therein, two left and two right spokes 15 and 16 connecting the core 13 of the grasping portion 5a and the boss plate 12, and a front steering cover 17 made of a synthetic resin, which is formed into a box-like shape covering front ends of the spokes 15 and 16 from the front thereof and opened at its rear end and which is secured to the boss plate 12.

An air bag module 18 is mounted to the steeling wheel 5. The air bag module 18 includes an inflator 19 including a vessel filled with a propellant for generating a high-pressure gas, an air bag 20 disposed in a folded state in rear of the inflator 19, and a rear steering cover 21 made of a synthetic resin, which covers a rear side of the air bag 20. The rear steering cover 21 includes an end wall portion 21a disposed to the rear of the air bag 20 and having a thinned portion which is broken when the air bag 20 is inflated, an outer wall portion 21b formed into a cylindrical shape to extend forward from the end wall portion 21a with its front end disposed in proximity to and in opposed relation to the rear end of the front steering cover 17, and an inner wall portion 21c formed into a cylindrical shape to extend forwards from the end wall portion 21a and surrounded by the outer wall portion 21b. A support member 22 formed into a bowl from a thin material is fitted in and fixed to a front end of the inner wall portion 21c. The inflator 19 is accommodated within the inner wall portion and fixed to the support member 22. The air bag 20 fixedly supported by the support member 22 is accommodated within the inner wall portion 21c, so that it is disposed between the inflator 19 and the end wall portion 21a.

Brackets 23$_1$ and 23$_2$ are integrally provided at opposite ends of the boss plate 12 to extend toward the air bag module 18, and thinned support arms 24$_1$ and 24$_2$ are integrally provided on the support member 22 and overlapped on outer sides of the brackets 23$_1$ and 23$_2$. Moreover, each of the support arms 24$_1$ and 24$_2$ has a longitudinally extending elongated hole 25 provided therein and a circular insertion hole 26 provided therein and connected to a front end of the elongated hole 25. The diameter of the insertion hole 26 is set larger than that of the elongated hole 25.

A bolt 27 having a diameter larger than the width of the elongated hole 25 is inserted through the insertion hole 26. The bolts 27 are threadedly into the brackets 23$_1$ and 23$_2$. Thus, the air bag module 18 is supported on the boss plate 12.

In such air bag module 18, the propellant in the inflator 19 is fired and burnt as a result of a collision of the vehicle, thereby supplying the high-pressure gas from the inflator 19 into the folded air bag 20 to expand the air bag 20. This causes a portion of the end wall portion 21a to be broken, thereby deploying the air bag 20 in to a vehicle compartment to hold back the driver. Moreover, when the air bag comes into contact with the driver, a resulting reaction force causes a load to be applied to the air bag module 18 in a direction opposite from a direction of development of the air bag 20, i.e., in a forward direction. As a result, the air bag module 18 is moved forwards, while the width of the elongated holes 25 are being increased by the bolts 27, and the opposite side edges of the elongated holes 25 are plastically deformed by the bolts 27. This causes a secondary collision energy applied from the driver to the air bag 20 to be effectively absorbed. Thus, it is possible to softly hold back the driver by the air bag 20.

A steering mechanism 30$_2$ as a driving means capable of producing a relative rotating motion between the steering wheel 5 and the column 6 is disposed within the steering wheel 5 in front of the air bag module 18. The steering mechanism 30$_2$ includes a servo motor 31 fixedly disposed on the steering wheel 5, a first reduction mechanism 32 for reducing the output from the servo motor 31, a second reduction mechanism 33 for further reducing the output from the first reduction mechanism 32, and an output shaft 34 mounted on the output side of the second reduction mechanism 33 and coupled to the rear end of the column 6.

The steering mechanism 30$_2$ has a housing 35 which includes a housing half 36 secured to the boss plate 12, and a housing half 37 coupled to the housing half 36. The servo motor 31 is fixedly supported to the housing 35 and has a rotating axis in a plane perpendicular to the axis of the column 6.

The first reduction mechanism 32 is constituted as a spur gear reduction mechanism and accommodated within the housing 35. The first reduction mechanism 32 includes an output gear 38 provided on the output shaft of the servo motor 31, and a reducing gear 39 meshed with the output gear 38. The second reduction mechanism 33 includes a crossed helical gear 40 rotatably supported by the housing 35, and a worm gear 41 as an operating member which is integral with the output shaft 34 and meshed with the crossed helical gear 40 and which is accommodated in the housing 35. The reducing gear 39 of the first reduction mechanism 32 is provided on one end of the crossed helical gear 40.

The output shaft 34 is formed into a hollow cylindrical shape, and the rear end of the column 6 is fitted into a front half of the output shaft 34. Moreover, the output shaft 34 and the column 6 are coupled to each other through a spline 42 for non-rotation relative to each other. The output shaft 34 is fixed to the rear end of the column 6 by engagement of a bolt 43 threadedly fitted over the rear end of the column 6 with an inner surface of an intermediate portion of the output shaft 34. A bearing 44 is interposed between the housing half 36 of the housing 35 and the output shaft 34, and a bearing 45 is interposed between the housing half 37 of the housing 35 and the output shaft 34, so that the output shaft 34 and the housing 35 are rotatable relative to each other about the axis of the column 6.

The output shaft 34 has a flange or bulge 34a integrally provided at the rear end thereof and protruding radially outwards from the output shaft 34 within the housing 35. The worm gear 41 of the second reduction mechanism 33 is formed into a fan-like shape and integrally connected to the bulge 34a.

In this way, the output from the servo motor 31 is reduced with a reduction ratio of, for example, about 500 by the first and second reduction mechanisms 32 and 33 and transmitted to the output shaft 34 and thus to the column 6. The reason why the reduction ratio is set at such a high value is that the steering wheel 5 is already steered to a sufficient steering angle and the servo motor 31 works only to correct the excessive deficiency of the steering angle provided by the driver and hence, the corrected rotational speed of the column 6 may be small, and further that if a torque as small as it can overcome the steering force applied by the driver to increase or decrease the amount of rotation of the column 6 is output, the purpose can be fulfilled.

Because the reduction ratio can be set at the large value as described above, the servo motor 31 maybe of a small capacity. This is advantageous for accommodating the servo motor 31 and the first and second reduction mechanisms 32 and 33 within a narrow steering wheel 5.

In a power transmitting system for transmitting the output from the servo motor 31 to the output shaft 34, the second reduction mechanism 33 including the crossed helical gear 40 and the worm gear 41 is an irreversible transmitting mechanism incapable of transmitting the rotational power from the output shaft 34 toward the first reduction mechanism 33, i.e., toward the servo motor 31. Therefore, the first reduction mechanism 32, the second reduction mechanism 33 and the output shaft 34 constitute a directly coupling means for directly coupling the steering wheel 5 and the column 6 to each other, so that a rotatively driving force can be transmitted from the steering wheel 5 directly to the column 6 during non-operation of the servo motor 31. Thus, when the driver operates the steering wheel 5 upon a servo motor 31 failure due to the stoppage of the supplying of the power to the servo motor 31 for any reason, such steering rotative force is immediately transmitted from the output shaft 34 to the column 6.

Referring especially to FIG. 9, the housing half 36 of the housing 35 fulfills a function as a locking member for engagement with the worm gear 41 as the operating member connected to the servo motor 31 to limit the range of operation of the worm gear 41. Namely, the angle of rotation of the fan-shaped worm gear 41 relative to the housing half 36 maybe, for example, 16 degree on a left side and 16 degree on a right side in FIG. 9. The housing half 36 is provided with limiting portions 36a and 36b for engagement with left and right sides of the worm gear 41 to limit the range of operation of the worm gear 41. Thus, even if the power-transmission irreversibility of the second reduction mechanism 33 should be lost, the steering rotative force of the steering wheel 5 can be transmitted directly to the column 6 through the output shaft after engagement of the limiting portions 36a or 36b with the worm gear 41.

The worm gear 41 has a pin 46 provided at its circumferentially intermediate portion and protruding toward the housing half 37 of the housing 35, and switches 47 and 48 are fixed to the housing half 37 and have detection lever 47a and 48a for detecting the pin 46. The switch 47 is fixed to the housing half 37 at a location in which the pin 46 is detected by the detecting lever 47a immediately before abutment of the worm gear 41 against the limiting portion 36a of the housing half 36, thereby changing the switching mode. The switch 48 is fixed to the housing half 37 in a location in which the pin 46 is detected by the detecting lever 48a immediately before abutment of the worm gear 41 against the limiting portion 36b of the housing half 36, thereby changing the switching mode. Moreover, each of the switches 47 and 48 cuts off the supplying of the power to the servo motor 31 by changing the switching mode as a result of detection of the pin 46 by the detecting lever 47a, 48a. Therefore, in a state in which the servo motor 31 is normally operative, it is possible to prevent the worm gear 41 from abutting against the limiting portion 36a or 36b to produce a disadvantage such as that an over-current flows to the servo motor 31.

Figure 10:
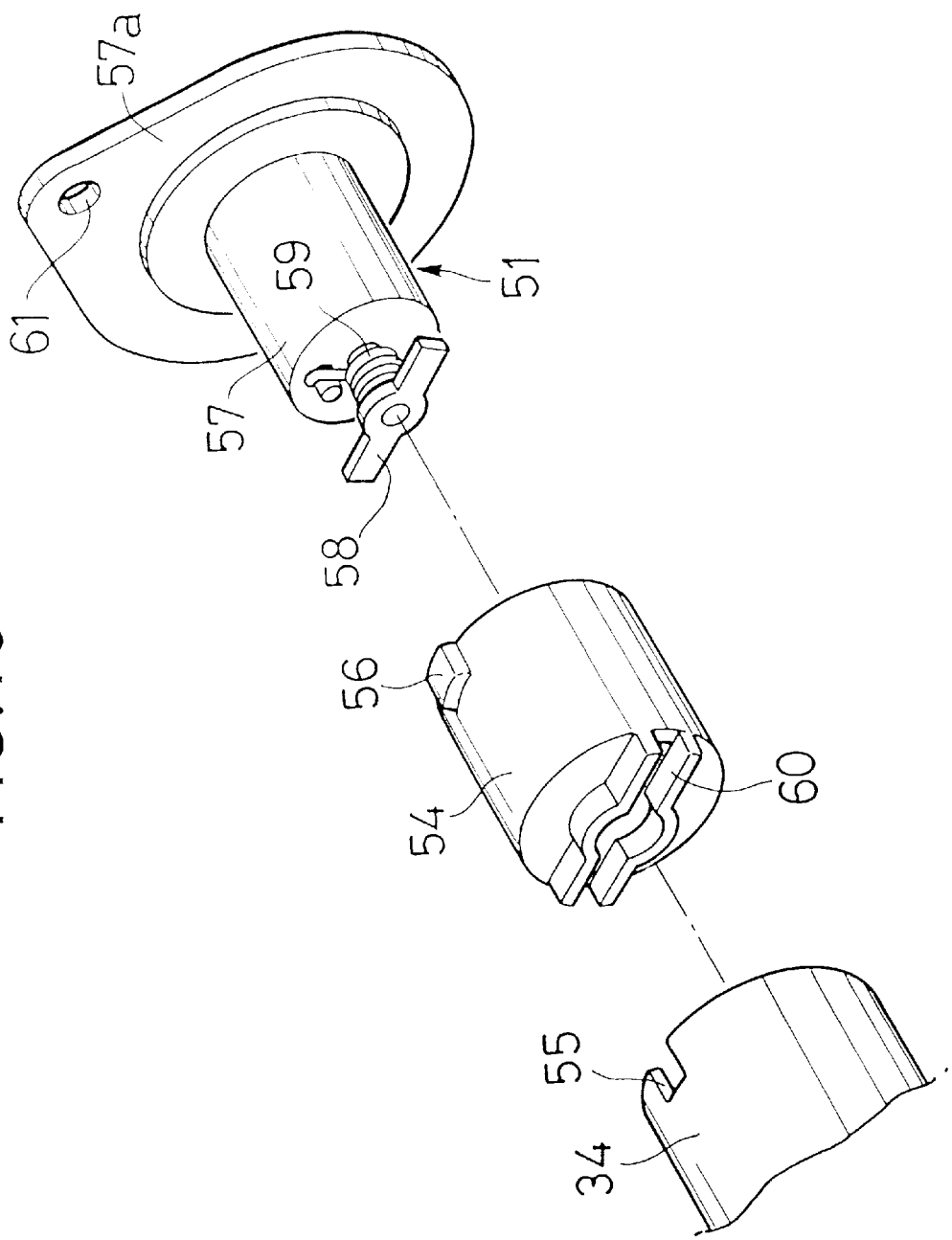
FIG. 10 is an exploded perspective view of a connecting portion between an encoder and a column.

Referring also to FIG. 10, an encoder 51 is disposed within the steering wheel 5 for detecting the correction steering angle which is an amount of relative displacement between the steering wheel 5 and the column 6. A connecting member 54 formed into a bottomed cylindrical shaft from a synthetic resin is fitted with its open end turned rearwards into the rear end of the output shaft 34 in rear of the bolt 43 for fixing the output shaft 34 to the column 6. An engage projection 56 is provided at a rear end of the connecting member 54 for engagement in a notch 55 provided in the rear end of the output shaft 34. Thus, in a state in which the connecting member 54 has been fitted into the rear end of the output shaft 34, the connecting member 54 is rotated along with the output shaft 34.

The encoder 51 includes a cylindrical case 57 having an outward protruding flange portion 57a at its rear end, a detector 58 rotatably protruding from a front end of the case 57, and a torsion spring 59 mounted between the case 57 and the detector 58. The detector 58 is formed long along one diametrical line of the case 57. When there is a mechanical looseness within the encoder 51, the torsion spring 59 removes an influence of such backlash by urging the detector 58 in one of the circumferential directions.

The encoder 51 is inserted into the connecting member 54 in such a manner that the flange portion 57a is brought into abutment against the housing half 37 of the housing 35. Moreover, a slit 60 is provided in a closed portion at the front end of the connecting member 54 to extend along one diametrical line, and the detector 58 of the encoder 51 is fitted into the slit 60. The flange portion 57a is provided with a positioning hole 61, and a positioning pin 62 is inserted through and engaged in the positioning hole 61 and fitted into the housing 35. Thus, the encoder 51 is incapable of being rotated relative to the housing 35 that assumes a stationary position relative to the steering wheel 5 and is accommodated in the connecting member 54 which is relatively non-rotatably fitted into the hollow output shaft 34, so that the amount of rotation of the output shaft 34 relative to the housing 35, i.e., the correction steering angle, is detected by the rotation of the detector 58 along with the connecting member 54.

The flange portion 57a of the encoder 51 is covered with a cover 63 which is detachably fixed to the housing 35 by a plurality of threaded members 64. The cover 63 functions to inhibit the disengagement of the positioning pin 62 out of the positioning hole 61 to maintain the fixed state of the encoder to the housing 35 and also serves as a thermal shielding material for preventing a high temperature from the air bag module 18 from adversely influencing the encoder 51, when the air bag 20 of the air bag module 18 is expanded.

When the steering wheel 5 is mounted to the column 6, the connecting member 54 is still not fitted into the rear end of the output shaft 34 in order to threadedly fit the bolt 43 over the rear end of the column 6 using a tool. After mounting of the steering wheel 5 to the column 6, the fitting of the connecting member 54 into the output shaft 34, the insertion of the encoder 51 into the connecting member 54, the insertion of the pin 62 through the hole 61, the mounting of the cover 63 to the housing 35 and the mounting of the air bag module 18 to the steering wheel 5 are sequentially carried out. Therefore, to remove the steering wheel 5 in a repairing factory, the operations may be carried out in an order opposite from the above order.

In this manner, the steering mechanism $30_2$ disposed between the steering wheel 5 and the column 6 is accommodated and disposed in the steering wheel 5, but even if the air bag module 18 is advanced when the air bag 20 of the air bag module 18 mounted to the steering wheel 5, it is necessary to avoid the contact of the air bag module 18 with the steering mechanism $30_2$. To this end, the steering mechanism $30_2$ is disposed within the steering wheel 5 in a location near the column 6 to define a space 50 between the steering mechanism $30_2$ and the air bag module 18 which is in an inoperative state.

According to the second embodiment, the steering mechanism $30_2$ including the servo motor 31 is mounted between the steering wheel 5 and the column 6, so that a relative rotating motion can be produced between the steering wheel 5 and the column 6. Therefore, even if any mechanisms exist from the column 6 to the front wheel 7, the steering angle can be corrected using the steering mechanism $30_2$ constructed in the same principle irrespective of these mechanisms. Thus, the following advantages are provided to vehicle makers: the mass-productivity is enhanced; the period for developing the vehicle can be shortened; and even after the vehicle including the steering angle correction system of the invention has been put on the market, it takes less time for education of a vehicle serviceman or the like, and the repair system can be simplified. In addition, the following advantages are provided to a part maker: in ordering the different specifications from the different vehicle makers, the developing period is short, and the time limit of delivery is shortened, because the steering mechanism $30_2$ can be designed in the same principle.

Moreover, the steering device 8 boosts the input torque from the steering wheel 5 at a gear ratio of about 15 to 20 and outputs it. If the steering mechanism $30_2$ is mounted at nearer the front wheel 7 than the steering device 8, the steering mechanism $30_2$ must withstand a large boosted torque and hence, is increased in size and weight. According to this embodiment of the present invention, however, the steering mechanism $30_2$ can be of a small size and a light weight, because it is mounted between the steering wheel 5 and the column 6.

In addition, by the fact that the steering mechanism $30_2$ is disposed in the position in which it does not hinder the spreading and developing of the air bag 20 of the air bag module 18 mounted to the steering wheel 5, the steering mechanism $30_2$ can be disposed within the steering wheel 5 which also serves as a shock absorbing device for alleviating the damage to an occupant upon a collision of the vehicle, in such a manner that the steering wheel 5 does not hinder the operation of the air bag module 18 which is a safety system.

Further, the servo motor 31, the first reduction mechanism 32, the second reduction mechanism 33 and the output shaft 34 constituting the steering mechanism $30_2$ constitute the direct coupling device capable of directly driving the column 6 from the side of the steering wheel 5 during non-operation of the servo motor 31. Therefore, when the servo motor 31 is in a failure state, the column 6 can be directly driven by the steering wheel 5, leading to a safety. Moreover, the worm gear 41 connected to the servo motor 31 is brought into engagement with the limiting portions 36a and 36b of the housing half 36, whereby the range of operation of the worm gear 41 is limited. Even this ensures that the column 6 can be directly driven from the steering wheel 5, leading to a safety. Further, it is possible to prevent an over-current from flowing to the servo motor 31 by cutting off the supplying of the power to the servo motor 31 by the switches 47 and 48 immediately before the worm gear 41 is brought into engagement with the limiting portions 36a and 36b of the housing 36.

Yet further, by the fact that the encoder 51 for detecting the amount of relative rotating displacement of the steering wheel 5 and the column 6 relative to each other is accommodated within the hollow output shaft 34 which is the component of the steering mechanism $30_2$, the encoder 51 can be reasonably disposed in a narrow space within the steering wheel 5.

In each of the first and second embodiments, the structure in which the steering mechanism $30_1$, $30_2$ is accommodated within the steering wheel 5 has been illustrated. Alternatively, as evident from the description in the first and second embodiments, it will be understood that the steering mechanism may be disposed at any location between the grasping portion 5a of the steering wheel 5 and the steering device 8.

Figure 11:
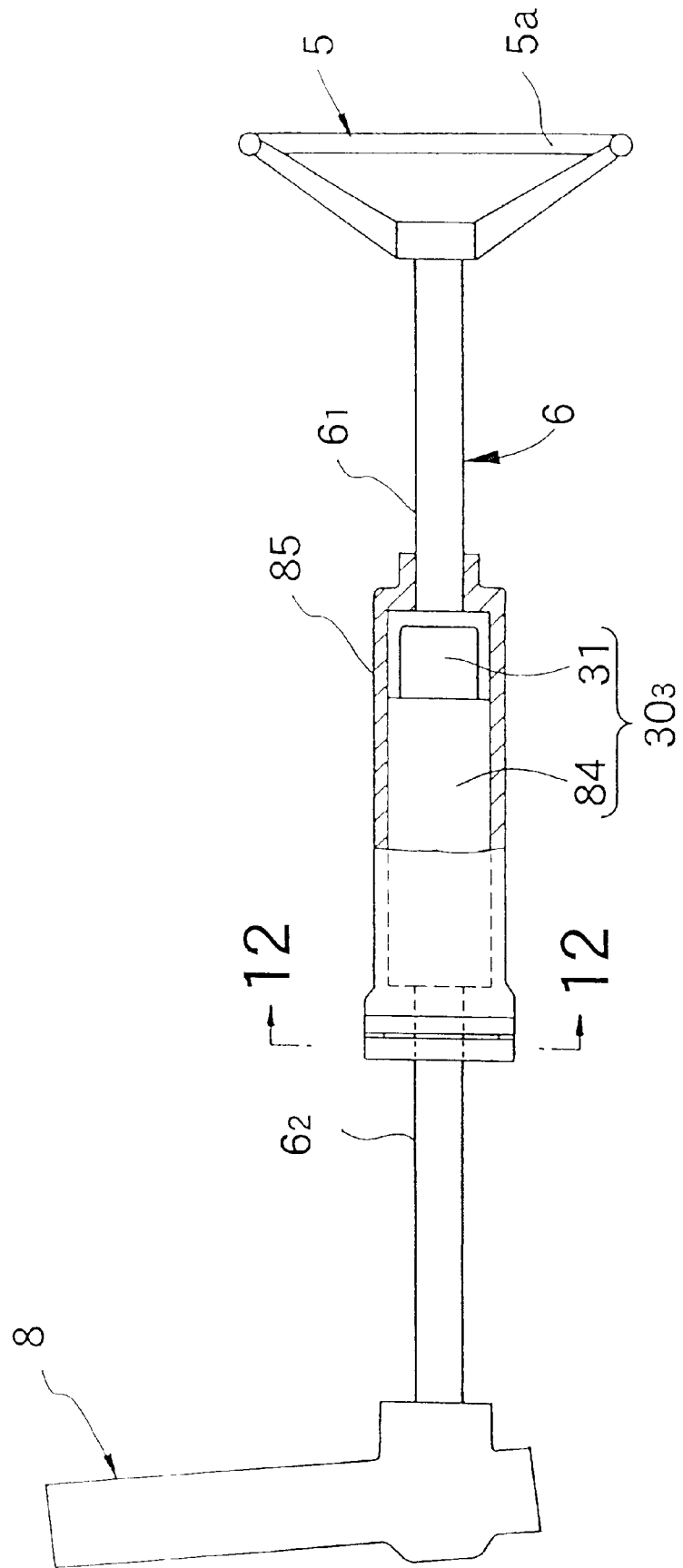
FIG. 11 is a partially cutaway plan view illustrating the entire arrangement of a steering system including a steering angle correcting system according to a third embodiment of the invention.
Figure 12:
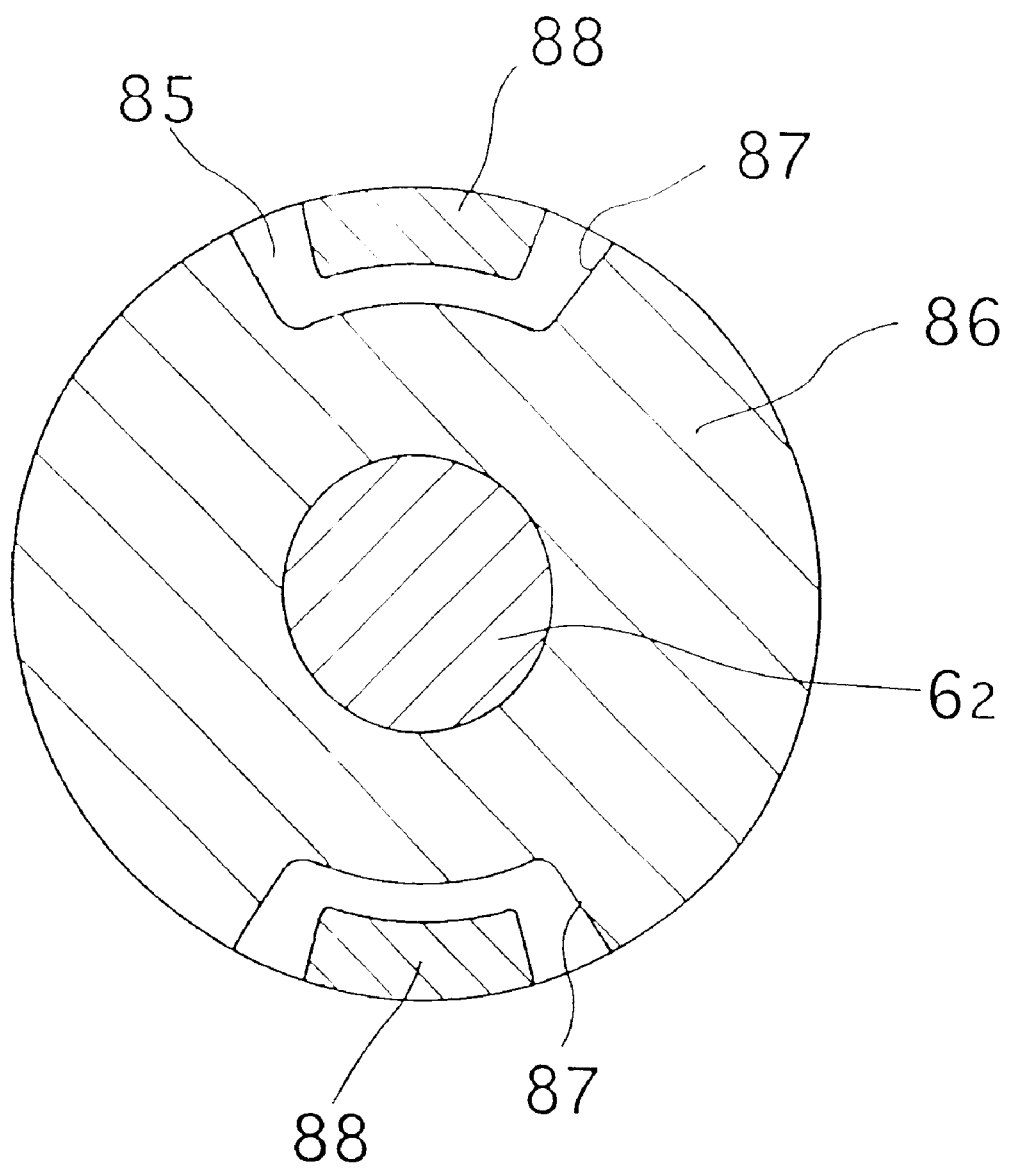
FIG. 12 is an enlarged sectional view taken along the line 12—12 in FIG. 11.

Therefore, in a third embodiment shown in FIGS. 11 and 12, a steering mechanism $30_3$ including a servo motor 31 and a reducer 84 having no full lock function is disposed at an intermediate portion of the column 6. The column 6 includes a column portion $6_1$ adjacent the steering wheel 5, and a column $6_2$ adjacent the steering device 8. The steering mechanism $30_3$ is fixedly accommodated within a casing 85 which is secured to the column portion $6_1$ adjacent the steering wheel 5, and the column portion $6_2$ adjacent the steering device 8 is coaxially connected to an output end of the reducer 84. A disk-like engage plate 86 is secured to the column portion $6_2$, and engage projections 88, 88 are projectingly provided on the casing 85 and are engageable in locking recesses 87, 87 which are provided, for example, at two places around an outer periphery of the engage plate 86. Such a structure constitutes a lost motion mechanism. The column portion $6_2$ and the casing 85, namely, the steering mechanism $30_3$ are rotatable relative to each other in a range in which the engage projections 88, 88 can be operated within the locking recesses 87, 87.

According to the third embodiment, when the supplying of the power to the servo motor 31 is stopped, even if the steering wheel 5 is steered in a range of play permitted by the lost motion mechanism, no substantial steering is produced.

In the field of robot technique, however, there is a developed clutch which is adapted to be automatically brought into engagement when the supplying of the power is stopped. If the clutch is disposed in parallel to the servo motor 31, the engagement of the clutch is performed simultaneously with the stoppage of electric power, so that a steering as intended by the driver can be achieved. This clutch does not constitute an important portion of the present invention and has been put into a known public use in the robot technical field. Therefore, the detailed description of the clutch is omitted.

The basic construction of the third embodiment is not different from those in the previously described first and second embodiments and is similar in function and effect to those in the first and second embodiments.

Figure 13:
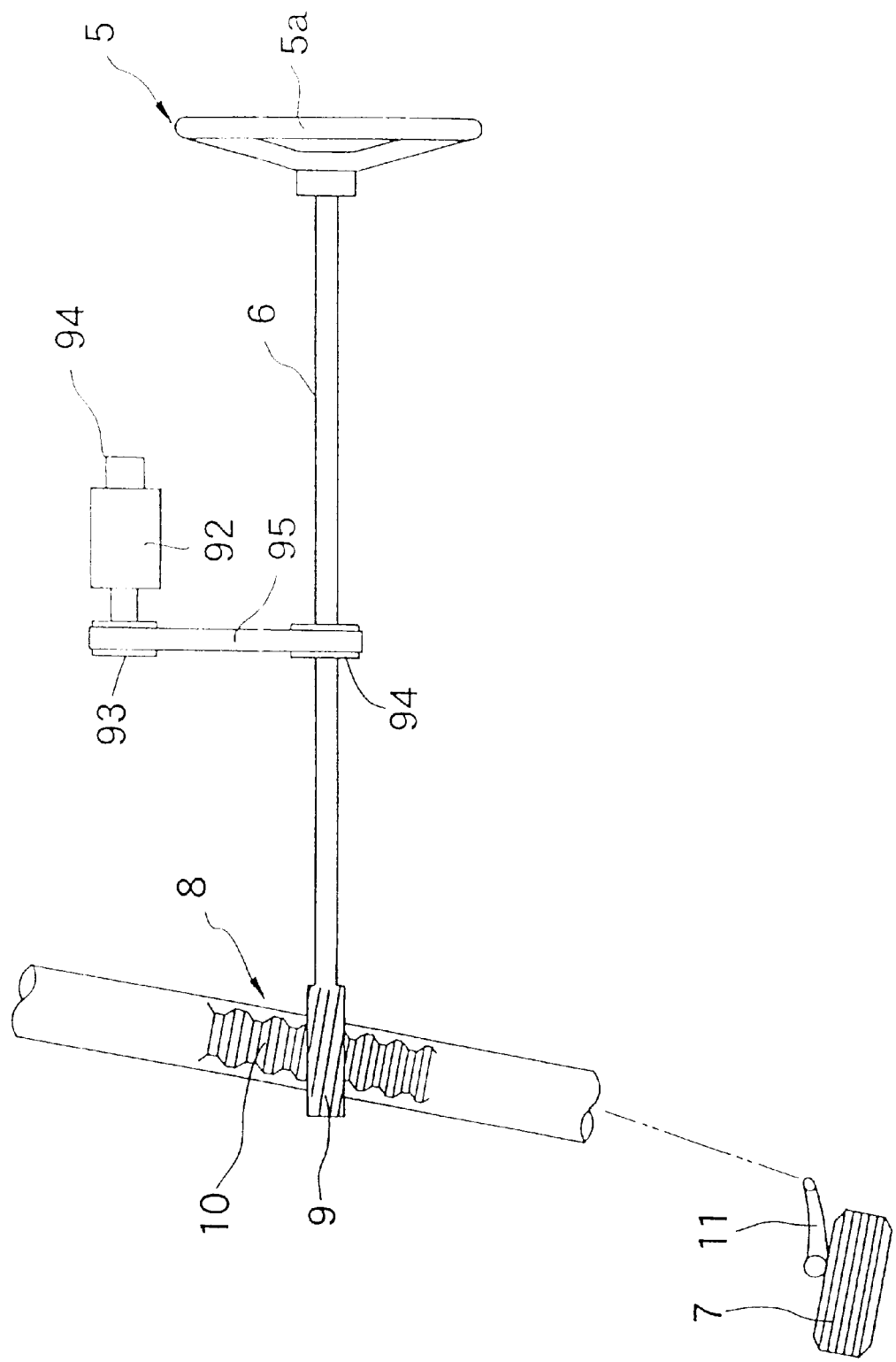
FIG. 13 is a plan view illustrating the entire arrangement of a steering system including a steering angle correcting system according to a fourth embodiment of the invention.

FIGS. 13 to 16 show a fourth embodiment. First, as shown in FIG. 13, a steering mechanism $30_4$ is connected to an intermediate portion of a column 6. The steering mechanism $30_4$ includes a bias motor 92 fixed to the vehicle body, a driving pulley 93 fixed to an output end of the bias motor 92, a follower pulley 94 fixed to the intermediate portion of the column 6, and a belt 95 reeved around both the pulleys 93 and 94, so that an output torque from the bias motor 92 is transmitted to the column 6. The amount θB of rotation of the bias motor 92 is detected by the encoder 94. A steering mechanism $30_1$ or $30_2$ (not shown FIG. 13) similar to that provided in the first or second embodiment is accommodated within the steering wheel 5 and serves as a relative angle changing means capable of changing the relative angle of the steering wheel 5 relative to the steering device 8. Therefore, in the fourth embodiment, the two motors 31 and 92 exist for the purpose of correcting the steering angle.

Figure 14:
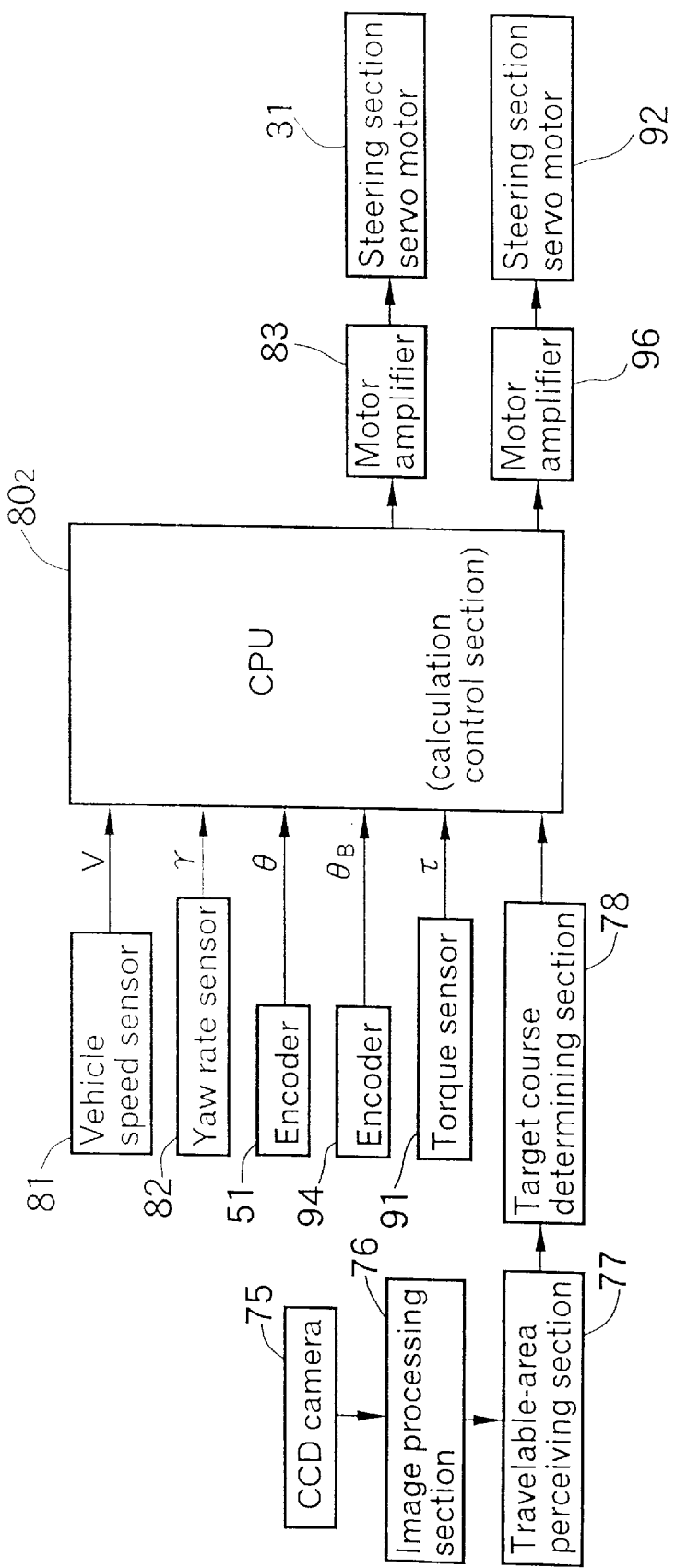
FIG. 14 is a block diagram illustrating the entire arrangement of the steering angle correcting system of the fourth embodiment.

Referring to FIG. 14, output signals from the target course determining section 78, the vehicle speed sensor 81, the yaw rate sensor 82 and the encoder 51 are input to a CPU $80_2$ as in the first embodiment. An output signal from the encoder 94 is also input to the CPU $80_2$ and further, an output from a torque sensor 91 for detecting a steering torque τ applied to the steering wheel 5 is input to the CPU $80_2$. Not only a control signal from the CPU $80_2$ is applied to a motor amplifier 83 which supplies a driving current to the servo motor 31 mounted within the steering wheel 5, but also a control signal from the CPU $80_2$ is applied to a motor amplifier 96 which supplies a driving current to the bias motor 92.

Figure 15A:
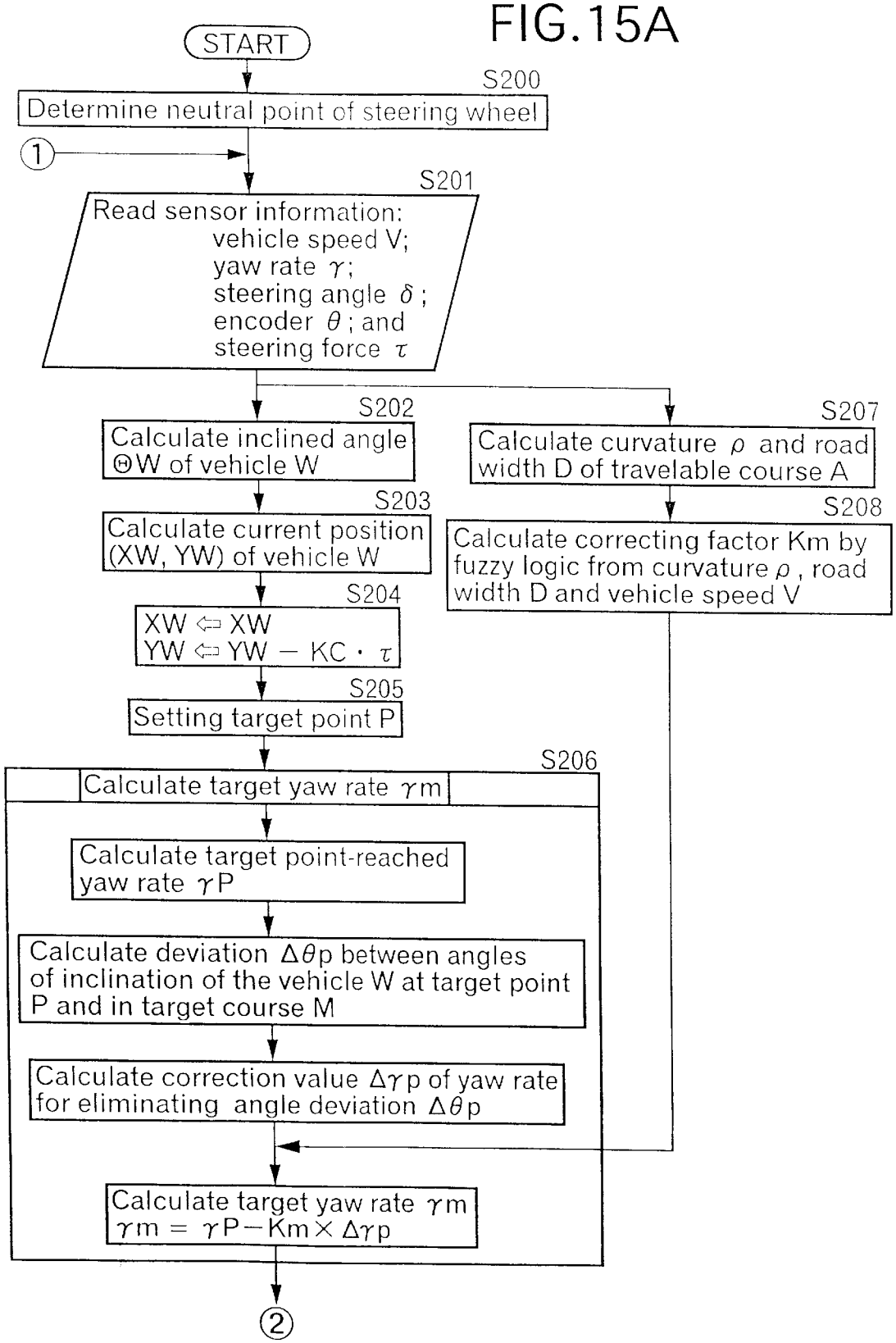
FIGS. 15A and 15B show a flow chart illustrating a processing program for a steering angle correcting control of the fourth embodiment.
Figure 15B:
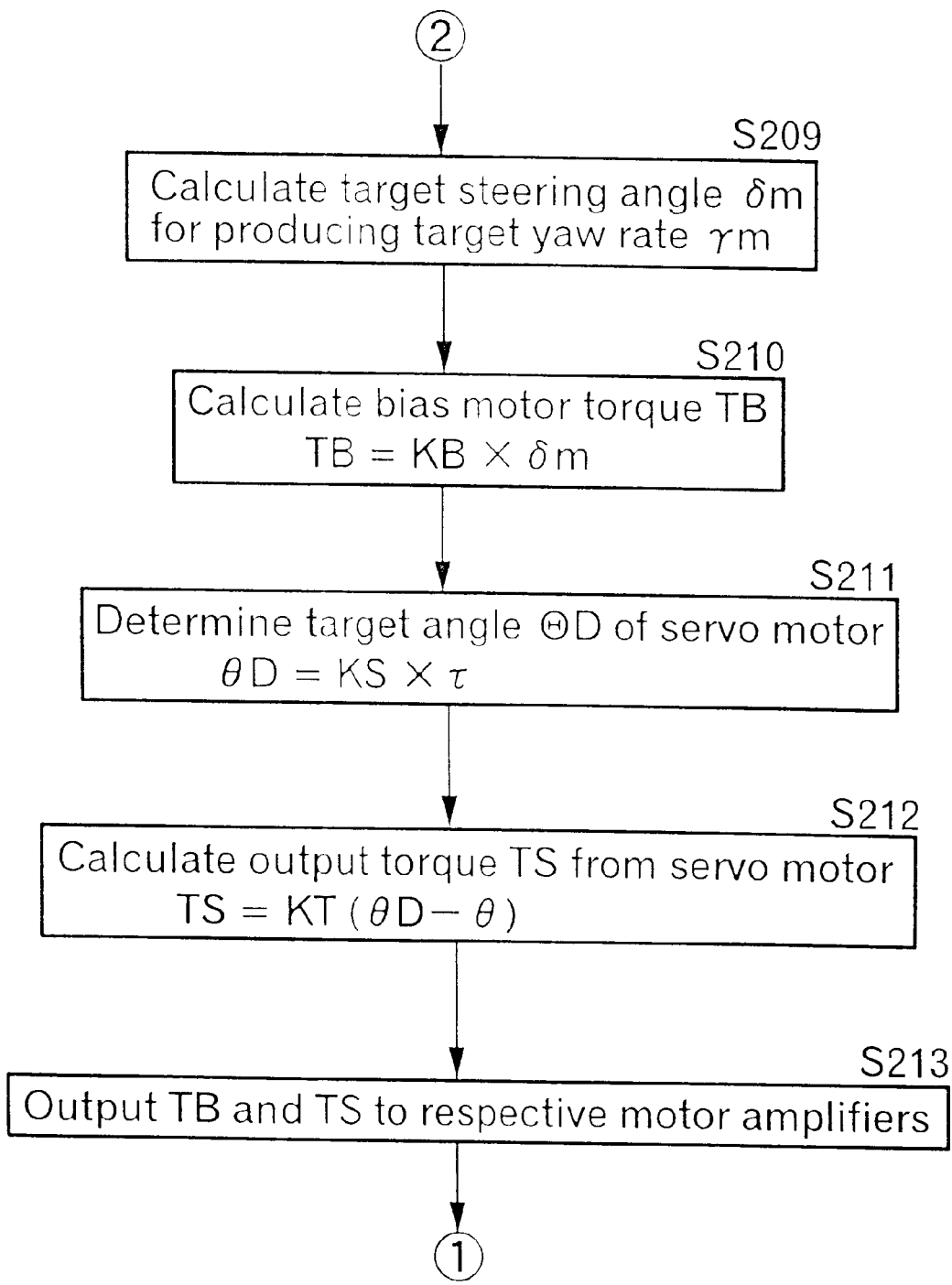
Figure 16:
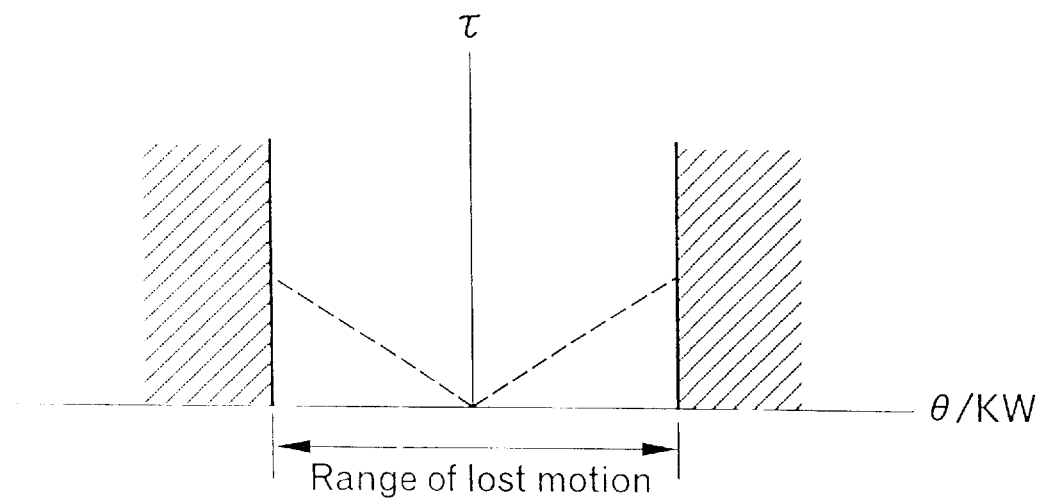
FIG. 16 is an illustration for explaining the processing in the flow chart in FIGS. 15A and 15B.

The CPU $80_2$ controls the operations of the servo motor 31 and the bias motor 92 according to a program shown in FIGS. 15A and 15B. At step S200, in order to detect a position of the steering wheel 5 relative to a central position of the lost motion mechanism, the servo motor 31 is slowly rotated, and values detected by the encoder 51 at the time when the tongue 73 abuts against the opposite end wall portions of the slit 74 shown in FIG. 3 are read, whereby the central position of the lost motion mechanism is determined by an average of the detection values, as shown in FIG. 16. By this processing, the CPU $80_2$ can perceive in a real time that the steering wheel 5 is inclined at what angle with respect to the column 6.

At the next step S201, outputs from the sensors are read. In this case, a steering angle 6 is read as a total sum of the values detected by the encoders 94 and 51.

At steps S202 to S209 subsequent to step S201, processing similar to those at steps S102 to S108 in the first embodiment excluding step S204 are carried out. At step s210, an output torque TB for the bias motor 92 is calculated by multiplying the target steering angle δm by a properly set factor KB.

At step S211, a target value θD for the angle of displacement of the servo motor 31 is determined by multiplying the detected steering torque τ by a properly set factor KS, and at step S212, an output torque TS from the servo motor 31 is determined so that the angle θ is equal to the determined target value θD. This provides a displacement through an angle resulting from the KS multiplication of the input steering torque τ and more specifically, provides a motor displacement proportional to the input steering torque τ, as shown in FIG. 16. Thus, the motor displacement is established laterally symmetrically with respect to a neutral point.

By conducting such a control, the steering mechanism $30_1$ including the servo motor 31 exhibits a kind of spring function. A technique for making a concept spring having a reaction force depending upon a stroke by the control is called a compliance control in a robot engineering and has been put into a known public use.

At step S213, the output torques TB and Ts determined as described above are output to the motor amplifiers 96 and 83 to operate the bias motor 92 and the servo motor 31.

The processing at step S204 will be now be described. An amount proportional to the steering torque τ applied to the steering wheel 5 (to be exact, an amount resulting from the multiplication of the steering torque by the properly set factor KC) is intentionally added to the widthwise position YW of the subject vehicle calculated at step S203, whereby making the system erroneously determine that the resulting position is the position of the subject vehicle.

As a result of this processing, the system which determines that the subject vehicle has been deviated by such amount with respect to the lane, conducts a correcting operation and consequently, the subject vehicle is allowed to travel in a course deviated by such amount within the lane. This effect will be described hereinafter.

According to such fourth embodiment, from a point of view from the driver, the steering wheel 5 is intended to be automatically turned through an appropriate angle along a curve of the lane. Therefore, if the driver steers the steering wheel 5 in an induced direction with his hand put lightly on the steering wheel 5, a driving along the curvature of the lane is naturally realized.

Thus, the road surface reaction force causes the steering wheel 5 to be returned in a straight travel direction in the first embodiment, whereas the steering wheel 5 is guided in the opposite direction in the fourth embodiment. In addition, in the first embodiment, when the driver conducts the general steering, he inputs the steering angle entirely on the basis of his experience, whereas in the fourth embodiment, even the angle of such general steering is suggested and hence, an interface further preferable to the driver can be formed.

If the driver desires to drive the vehicle into an adjacent lane against the suggestion of the general steering angle by his own intention, the driver may steer the steering wheel against the induced torque. In this case, the bias motor 92 is driven reversely from the output torque from itself and acts as a generator rather than as the motor, but any problem is not arisen.

When the steering wheel 5 is being operated in accordance with the induced torque, a reaction intending to return the steering wheel 5 to the center position is generated, and is an amount according to the position of the steering wheel 5 as it is more spaced apart from the center position. Therefore, it is possible for the driver to operate in the center position of the lost motion by the steering force, as shown in FIG. 16, thereby obtaining a feeling different from a play at the central portion of the lost motion, which has been felt in the first embodiment.

Further, as a result of the driver putting the steering wheel 5 at a central position of the play, equal controllable angles are always prepared on opposite sides of the set position of the steering wheel 5 from the point of view of the automatic steering system, thereby providing a result preferable for the control.

Yet further, the current position of the vehicle is processed as a position, slightly deviated from the actual position in accordance with the applied steering force τ and hence, the vehicle position can be slightly changed in the same lane within the target course. This function is convenient, because if the driver desires to drive the vehicle to travel on a slight right-side course within the lane when there is a small object fallen within the lane, which is not desired to be treaded by the tire, or when a road building vehicle is parking on the shoulder of a road, a traveling as intended by the driver can be easily realized by applying a slight torque to the steering wheel 5. In addition, when an input torque is applied, the vehicle behaves straightforwardly and hence, the above-described play cannot be actually taken-in by the driver in cooperation with the action of the above-described phantom spring.

In the examples disclosed herein, the target course is changed in accordance with the steering torque, but even if the angle displacement between grasping portion 5a of the steering wheel 5 and the steering device 8 is used in place of the steering torque, a similar effect can be obtained. This is because the displacement and the force are connected in a strong interrelation in the spring system. In this embodiment, the angle of rotation of the servo motor 31 accommodated within the steering wheel 5 can be utilized.

Even in the fourth embodiment, the automatic correction of the steering angle can be carried out against an external disturbance such as a side wind during traveling of the vehicle and therefore, the troublesomeness of the driver's correcting operation is reduced by half. In addition, the amount of steering conducted by a human is suggested and hence, the difference between the amount of steering conducted by the human and the target steering amount in the system is smaller. Thus, the servo motor 31 within the steering wheel 5 may be of further reduced size and weight, as compared with the third embodiment.

In order to further emphasize the feature of the fourth embodiment with regard to the reductions in size and weight of the motor, for example, it is supposed that the human's steering intention and the steering angle determined in the system are largely different from each other irrespective of such an excellent induction of steering being performed. The lack of the capability of the motor means that the correction of the motor cannot catch up to the determination of human's intention, but to begin with, it is necessary to consider why so large a difference is produced between the torque intended by the human and the system torque. In such a case, the human, from a higher-level stand, intends what is different from the maintaining of the lane, for example, the fact that he changes the lane or the fact that he leaves a highway. This is rational in view of an intrinsic object that the human's steering intention overrides the steering angle correcting device, and hence, there is nothing to fear.

The fourth embodiment has been described about the case where the output from the bias motor 92 is transmitted to the column through the belt 95. The mechanism for exerting the torque to the steering system need not be limited to such a construction, and a bias torque can be created only by changing the conventional hydraulic power-steering internal mechanism or the electric power-steering control program.

In the fourth embodiment, the misperceiving technique is used to displace the travel course by a very small amount, but the displacement of the course can be otherwise realized by displacing the target point. Such a technique will be described by way of fifth embodiment shown in FIGS. 17A and 17B.

Figure 17B:
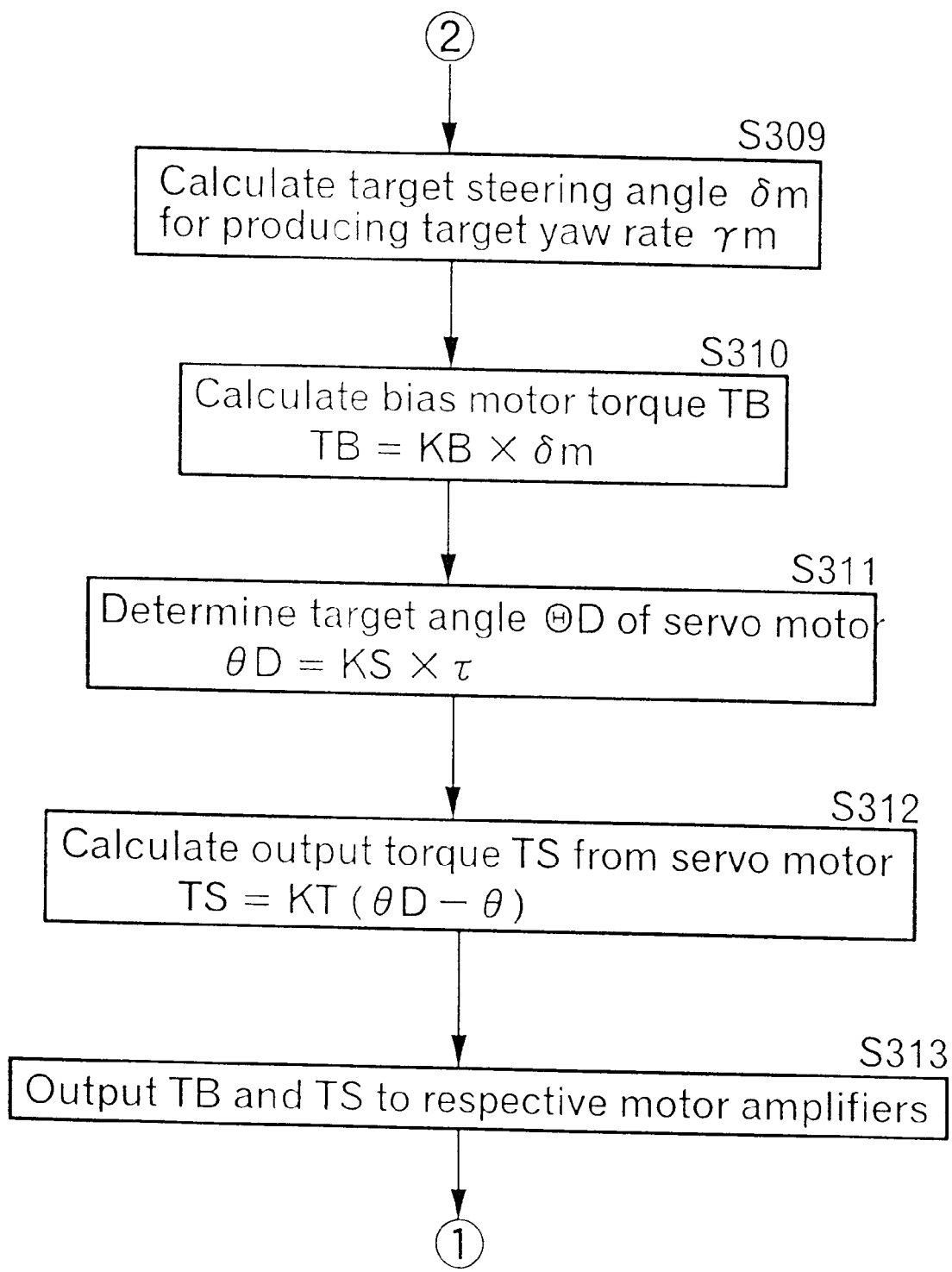

The fifth embodiment is different from the forth embodiment in respect of only a control algorithm shown in FIGS. 17A and 17B, and other constructions are the same as in the fourth embodiment.

At steps S300 to S304, the same processings as at steps S200 to S203 and S205 in the fourth embodiment shown in FIGS. 15A and 15B are carried out. At step S305, the target point P is moved rightwards in a Y-axis direction by $KC \times \tau$, and the resulting point is defined as a new target point, proceeding to step S306. The processings at steps S306 to S313 are the same as at steps S206 to S213 in the fourth embodiment shown in FIGS. 15A and 15B.

According to the fifth embodiment, when an object not desired to be treaded by the tire exists on a road during traveling of the vehicle on a central portion of a lane, the travel course can be easily changed by a very small amount, as in the fourth embodiment.

Many techniques for displacing the target course by a very small amount can be conceived in addition to those in the fourth and fifth embodiment, and for example, such displacement can be realized even by displacing a white-line position determined in the image processing section 76 leftwards or rightwards by a very small amount. And many techniques for the displacement may easily be achieved by the embodiments described above.

Figure 18:
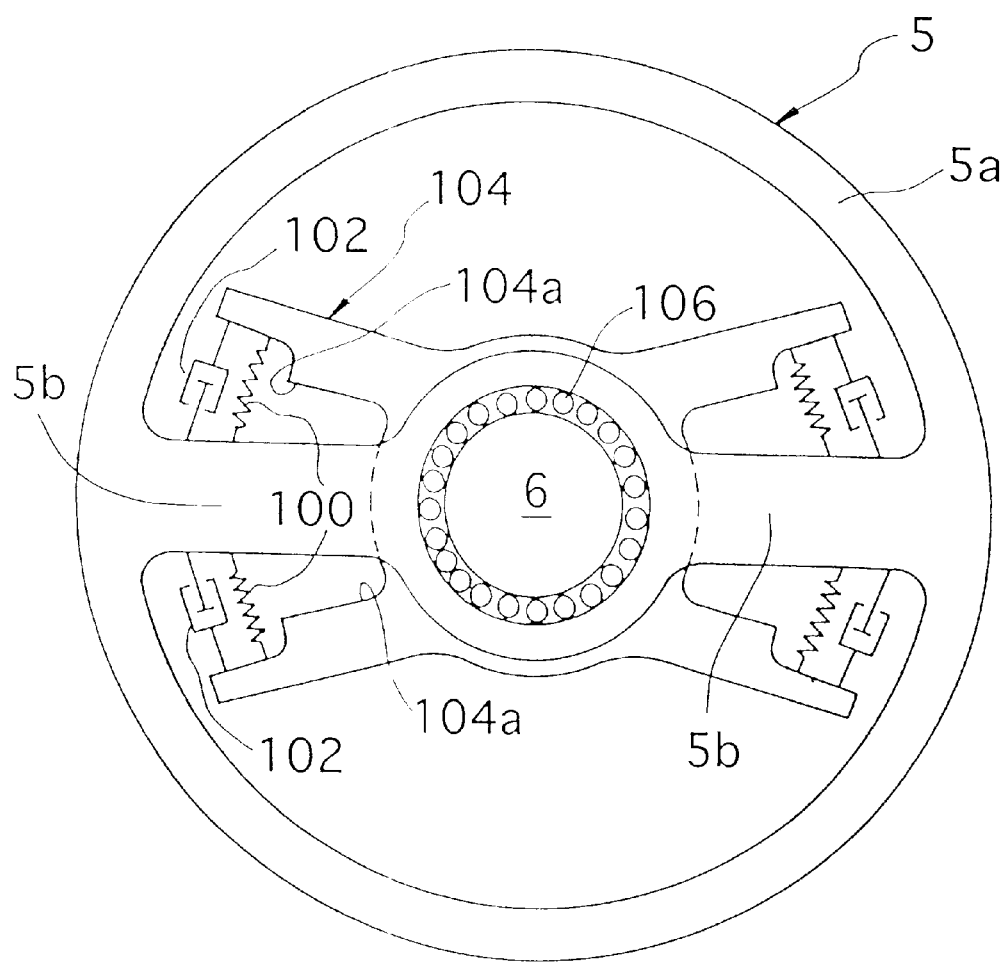
FIG. 18 is a simplified front view of a steering wheel including a steering angle correcting system according to a sixth embodiment of the invention.

FIG. 18 illustrates a sixth embodiment. In the sixth embodiment, the construction within the steering wheel 5 in the fourth embodiment is simplified to further enhance the productivity. The internal structure in the steering wheel in the fourth embodiment consequently realizes a combination of the spring and the damper, and in view of this fact, these spring and damper are replaced by a mechanical spring 100 and a damper 102.

More specifically, a substantially H-shaped lever 104 is fixed to the column 6. This lever 104 and the steering wheel 5 are relatively rotatably connected to each other through a bearing 106, and the spring 100 and the damper 102 are mounted between spoke portions 5b, 5b of the steering wheel 5 and the lever 104, respectively.

The spoke portions 5b, 5b are adapted to be put into abutment against walls 104a, 104a provided on the lever 104, when the steering wheel 5 is turned by a predetermined amount (e.g., 10 degree), whereby a steering force is transmitted from the lever 104 to the column 6.

A bias motor 92 for driving the column 6 is provided as in the sixth embodiment.

According to the sixth embodiment, a function and effect similar to those in the fourth embodiment can be achieved and moreover, the spring and the damper can be produced with a light weight and at a low cost, as compared with the fourth embodiment, leading to a high reliability.

Especially, there is an advantage that the space within the steering wheel 5 can be remarkably saved and hence, the conflict between devices within the steering wheel 5, such as the air bag, and the space is difficult to occur.

On the other hand, it is undeniable that in the establishment of the spring characteristic, the freedom of degree of design thereof is limited. When the control shown in FIGS. 15A and 15B is stopped in a case where a mechanism such as a clutch is not mounted, the rigidity is reduced by an amount corresponding to the resiliency of the spring 100 and hence, it is necessary to design a rigidity distribution of the entire steering system including a rubber mount.

For any trouble produced in the hardware or the software of the steering angle correcting system, the maximum value of the relative motion is limited by a mechanical stopper which includes the wall 104a, 104a of the lever 104 and the spoke portions 5b, 5b. Thus, even if a trouble should be produced, an obstacle can be avoided by a manual steering.

Figure 19:
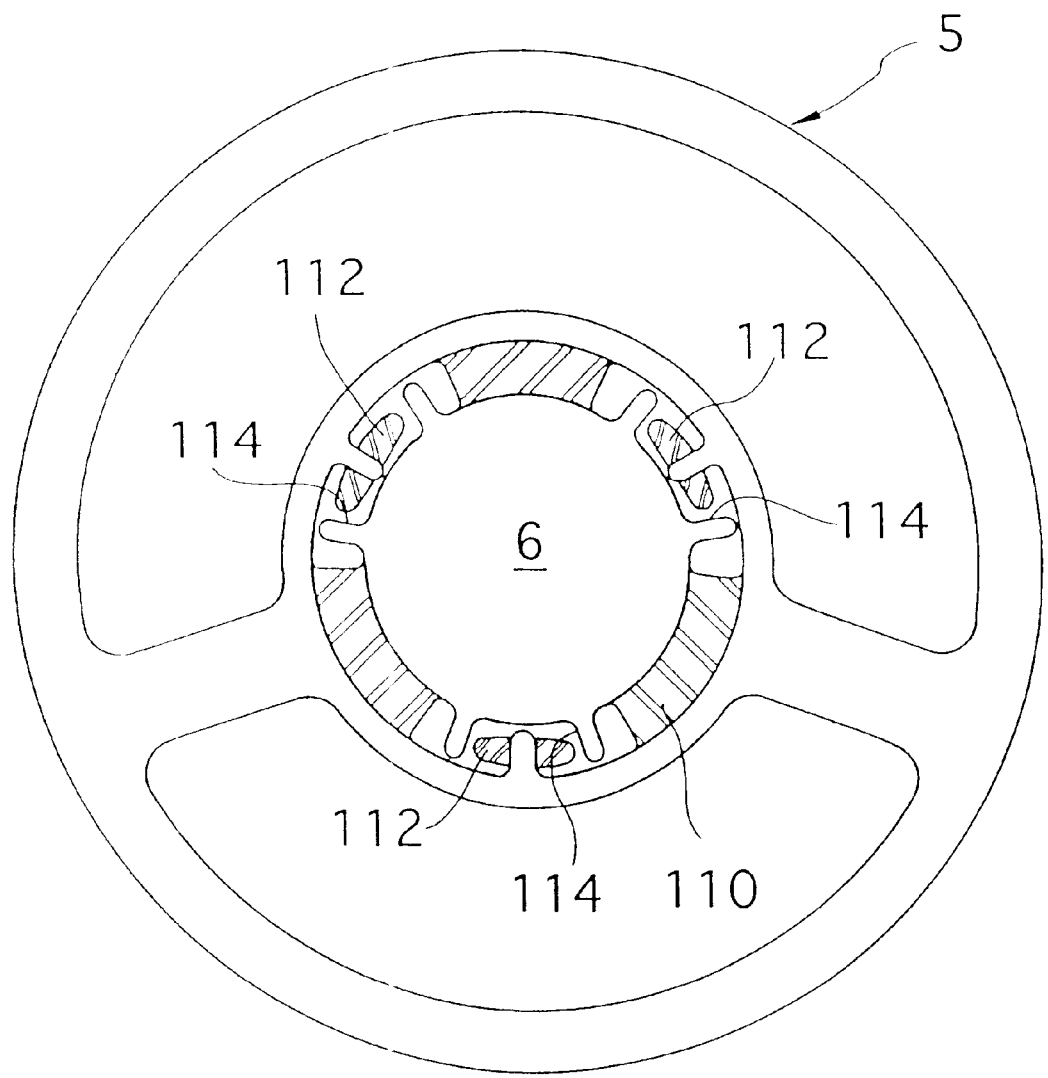
FIG. 19 is a simplified front view of a steering wheel including a steering angle correcting system according to a seventh embodiment of the present invention.

FIG. 19 illustrates a seventh embodiment. In this seventh embodiment, a plurality of rubbers 110 are mountedbetween the steering wheel 5 and the column 5 in place of the combination of the spring 100 and the damper 102 in the sixth embodiment. To limit the amount of relative rotation between the steering wheel 5 and the column 6, limiting rubbers 112 are secured to the steering wheel 5 and accommodated in a limiting recess 4 provided in the column 6.

The rubbers 110 have a resiliency and also have an internal resistance exhibiting a Hysteresis with respect to the displacement, as is well-known. The rubbers 110 fulfill a function equivalent to that of a kind of damper.

According to the seventh embodiment, a bearing mechanism between the steering wheel 5 and the column 6 required in the sixth embodiment is not required by the provision of the rubbers 110 between the steering wheel 5 and the column 6.

Although the embodiments of the present invention have been described in detail, it will be understood that the present invention is not limited to the above-described embodiments, and various modifications may be made without departing from the spirit and scope of the invention defined in claims.

For example, the steering device 8 is not limited to the rack and pinion type, and may be a power-steering device and a manual steering device. The bias motor 92 illustrated in the fourth embodiment is necessarily not critical and when the steering device 8 is a power steering device, the bias motor 92 may be replaced by a driving force generating device which the power steering device intrinsically has. For example, in an electric power-steering device, the correction of the steering angle can be realized by changing the control software of the electric power-steering device.

In each of the embodiments, the CCD camera 75 is used to acquire the information of the lane ahead of the vehicle, but the information acquiring means is not limited to the camera 75, and the information of the lane ahead of the vehicle can be acquired even by another technique. For example, an attempt has been recently proposed to drive the vehicle to travel within a lane in dependence upon a magnetic mark embedded in a road. In addition, when navigation information more precise than that in the current art will be realized, such an information can be used in place of the information of the CCD camera 75.

What is claimed is:

1. A steering angle correcting system in a vehicle, comprising:
   a first detecting means for detecting a state of a lane of a road ahead of the vehicle on which the vehicle is traveling;
   a second detecting means for detecting a relationship of a current position of the subject vehicle to the road lane of the subject vehicle;
   a steering amount calculating means for calculating a steering amount required to maintain an aimed relationship of the position of the subject vehicle to the road lane ahead of the subject vehicle from outputs from said first and second detecting means;
   a steering amount detecting means for detecting a current steering amount; and
   a driving means for driving a steering device such as to decrease the difference between a steering amount calculated in said steering amount calculating means and a steering amount detected by said steering amount detecting means, said driving means being mounted between a grasping portion of a steering wheel and said steering device, wherein said driving means is arranged to permit a relative motion to be produced between said grasping portion of said steering wheel and said steering device in an operative state of said driving means, but to inhibit said relative motion in an inoperative state of said driving means.

2. A steering angle correcting system in a vehicle comprising:
   a first detecting means for detecting a state of a lane of a road ahead of the vehicle on which the vehicle is traveling;
   a second detecting means for detecting a relationship of a current position of the subject vehicle to the road lane of the subject vehicle;
   a steering amount calculating means for calculating a steering amount required to maintain an aimed relationship of the position of the subject vehicle to the road lane ahead of the subject vehicle from outputs from said first and second detecting means;
   a steering amount detecting means for detecting a current steering amount; and
   a driving means for driving a steering device such as to decrease the difference between a steering amount calculated in said steering amount calculating means and a steering amount detected by said steering amount detecting means, said driving means being mounted between a grasping portion of a steering wheel and said steering device, wherein said driving means is provided, in its driving force transmitting path, with an irreversible transmitting means for inhibiting the transmission of a force from a side of said steering device.

3. A steering angle correcting system in a vehicle according to claim 2, wherein said steering amount calculating means is arranged to operate said driving means in a direction to decrease a relative angle between the grasping portion of said steering wheel and said steering device in accordance with the displacement of said relative angle from a reference value of the relative angle.

4. A steering angle correcting system in a vehicle, comprising:
   a first detecting means for detecting a state of a lane of a road ahead of the vehicle on which the vehicle is traveling;
   a second detecting means for detecting a relationship of a current position of the subject vehicle to the road lane of the subject vehicle;
   a steering amount calculating means for calculating a steering amount required to maintain an aimed relationship of the position of the subject vehicle to the road lane ahead of the subject vehicle from outputs from said first and second detecting means;
   a steering amount detecting means for detecting a current steering amount; and
   a driving means for driving a steering device such as to decrease the difference between a steering amount calculated in said steering amount calculating means and a steering amount detected by said steering amount detecting means, said driving means being mounted between a grasping portion of a steering wheel and said steering device wherein the operation of said driving means is stopped when it is determined that the vehicle has changed the lane based on an output from said second detecting means.

5. A steering angle correcting system in a vehicle, comprising:
   a first detecting means for detecting a state of a lane of a road ahead of the vehicle on which the vehicle is traveling;
   a second detecting means for detecting a relationship of a current position of the subject vehicle to the road lane of the subject vehicle;
   a steering amount calculating means for calculating a steering amount required to maintain an aimed relationship of the position of the subject vehicle to the road lane ahead of the subject vehicle from outputs from said first and second detecting means;
   a steering amount detecting means for detecting a current steering amount; and
   a driving means for driving a steering device such as to decrease the difference between a steering amount calculated in said steering amount calculating means and a steering amount detected by said steering amount detecting means said driving means being mounted between a grasping portion of a steering wheel and said steering device, wherein said driving means is operated in such a direction that said steering device is directed to a predetermined angle, when it is determined that the vehicle has changed the lane based on an output from said second detecting means.

6. A steering angle correcting system in a vehicle, comprising:
   a first detecting means for detecting a state of a lane of a road ahead of the vehicle on which the vehicle is traveling;
   a second detecting means for detecting a relationship of a current position of the subject vehicle to the road lane of the subject vehicle;
   a steering amount calculating means for calculating a steering amount required to maintain an aimed relationship of the position of the subject vehicle to the road lane ahead of the subject vehicle form outputs from said first and second detecting means;

a steering amount detecting means for detecting a current steering amount;

a driving means mounted between a vehicle body and a steering device for driving said steering device such as to decrease the difference between a steering amount calculated in said steering amount calculating means and a steering amount detected by said steering amount detecting means; and a relative angle changing means capable of changing the relative angle of a grasping portion of a steering wheel relative to said steering device, wherein said relative angle changing means is mounted between the grasping portion of said steering wheel and said steering device, and wherein said relative angle changing means is formed of a combination of an elastic member and a damper.

7. A steering angle correcting system in a vehicle according to claim 6, further including a torque detecting means for detecting the direction and magnitude of a steering force applied to said steering wheel, wherein the relative positional relationship to be maintained between the subject vehicle and the lane ahead of the subject vehicle is changed in relation to an output from said torque detecting means.

8. A steering angle correcting system in a vehicle according to claim 6, further including a displacement detecting means for detecting the relative displacement between the grasping portion of said steering wheel and said steering device, wherein the relative positional relationship to be maintained between the subject vehicle and the lane ahead of the subject vehicle is changed in relation to an output from said displacement detecting means.

9. A steering angle correcting system in a vehicle according to claim 2 or 6, further including a mechanical limiting means for limiting the relative motion between the grasping portion of said steering wheel and said steering device to a predetermined angle range.

10. A steering angle correcting system in a vehicle, comprising:

a first detecting means for detecting a state of a lane of a road ahead of the vehicle on which the vehicle is traveling;

a second detecting means for detecting a relationship of a current position of the subject vehicle to the road lane of the subject vehicle;

a steering amount calculating means for calculating a steering amount required to maintain an aimed relationship of the position of the subject vehicle to the road lane ahead of the subject vehicle form outputs from said first and second detecting means;

a steering amount detecting means for detecting a current steering amount;

a driving means mounted between a vehicle body and a steering device for driving said steering device such as to decrease the difference between a steering amount calculated in said steering amount calculating means and a steering amount detected by said steering amount detecting means; and a relative angle changing means capable of changing the relative angle of a grasping portion of a steering wheel relative to said steering device, further including a torque detecting means for detecting the direction and magnitude of a steering force applied to said steering wheel, wherein a target relative angle for said relative angle changing means is determined in relation to an output from said torque detecting means.

11. A steering angle correcting system in a vehicle comprising:

a first detecting means for detecting a state of a lane of a road ahead of the vehicle on which the vehicle is traveling;

a second detecting means for detecting a relationship of a current position of the subject vehicle to the road lane of the subject vehicle;

a steering amount calculating means for calculating a steering amount required to maintain an aimed relationship of the position of the subject vehicle to the road lane ahead of the subject vehicle form outputs from said first and second detecting means;

a steering amount detecting means for detecting a current steering amount;

a driving means mounted between a vehicle body and a steering device for driving said steering device such as to decrease the difference between a steering amount calculated in said steering amount calculating means and a steering amount detected by said steering amount detecting means; and a relative angle changing means capable of changing the relative angle of a grasping portion of a steering wheel relative to said steering device, further including a torque detecting means for detecting the direction and magnitude of a steering force applied to said steering wheel and a displacement detecting means for detecting the relative displacement between the grasping portion of said steering wheel and said steering device, wherein in the relative positional relationship to be maintained between the subject vehicle and the lane ahead of the subject vehicle is changed by exerting, on the output from said second detecting means, an influence of an amount dependent upon outputs from said torque detecting means and said displacement detecting means.

12. A steering angle correcting system in a vehicle comprising:

a first detecting means for detecting a state of a lane of a road ahead of the vehicle on which the vehicle is traveling;

a second detecting means for detecting a relationship of a current position of the subject vehicle to the road lane of the subject vehicle;

a steering amount calculating means for calculating a steering amount required to maintain an aimed relationship of the position of the subject vehicle to the road lane ahead of the subject vehicle form outputs from said first and second detecting means;

a steering amount detecting means for detecting a current steering amount;

a driving means mounted between a vehicle body and a steering device for driving said steering device such as to decrease the difference between a steering amount calculated in said steering amount calculating means and a steering amount detected by said steering amount detecting means; and a relative angle changing means capable of changing the relative angle of a grasping portion of a steering wheel relative to said steering device, further including a torque detecting means for detecting the direction and magnitude of a steering force applied to said steering wheel and a displacement detecting means for detecting the relative displacement between the grasping portion of said steering wheel and said steering device, wherein the relative positional relationship to be maintained between the subject vehicle and the lane ahead of the subject vehicle is changed by exerting, on a target relative positional relationship between the subject vehicle and the lane ahead of the subject vehicle, an influence of an amount dependent upon outputs from said torque detecting means and said displacement detecting means.

13. A steering angle correcting system in a vehicle, comprising:

a steering amount detecting means for detecting a current steering angle amount based on a position of a grasping portion of a vehicle steering wheel;

a vehicle steering device for controlling a steering angle of steered wheels of the vehicle;

a position detecting means for detecting a relationship of a current position of the vehicle to a road lane on which the vehicle is traveling;

a steering amount calculating means for calculating a steering angle amount required to maintain an aimed relationship of the vehicle to the road lane based on the relationship of the current position of the vehicle to the road lane of the vehicle from an output from said position detecting means; and a driving means connected between said grasping portion of the vehicle steering wheel and said vehicle steering device for driving said vehicle steering device relative to said grasping portion of the vehicle steering wheel such as to decrease the difference between said steering angle amount calculated in said steering amount calculating means and said current steering angle amount detected by said steering amount detecting means;

wherein said driving means is mounted on said vehicle steering wheel and produces relative motion between said grasping portion of said steering wheel and a steering column leading to said vehicle steering device.

14. A steering angle correcting system in a vehicle, comprising:

a steering amount detecting means for detecting a current steering angle amount based on a position of a grasping portion of a vehicle steering wheel;

a vehicle steering device for controlling a steering angle of steered wheels of the vehicle;

a position detecting means for detecting a relationship of a current position of the vehicle to a road lane on which the vehicle is traveling;

a steering amount calculating means for calculating a steering angle amount required to maintain an aimed relationship of the vehicle to the road lane based on the relationship of the current position of the vehicle to the road lane of the vehicle from an output from said position detecting means; and a driving means connected between said grasping portion of the vehicle steering wheel and said vehicle steering device for driving said vehicle steering device relative to said grasping portion of the vehicle steering wheel such as to decrease the difference between said steering angle amount calculated in said steering amount calculating means and said current steering angle amount detected by said steering amount detecting means;

wherein said driving means is provided with means for progressively returning said vehicle steering device to a neutral position relative to said grasping portion of said vehicle steering wheel when the vehicle reaches said aimed relationship with the road lane.

15. A steering angle correcting system in a vehicle, comprising:

a steering amount detecting means for detecting a current steering angle amount based on a position of a grasping portion of a vehicle steering wheel;

a vehicle steering device for controlling a steering angle of steered wheels of the vehicle;

a position detecting means for detecting a relationship of a current position of the vehicle to a road lane on which the vehicle is traveling;

a steering amount calculating means for calculating a steering angle amount required to maintain an aimed relationship of the vehicle to the road lane based on the relationship of the current position of the vehicle to the road lane of the vehicle from an output from said position detecting means; and a driving means connected between said grasping portion of the vehicle steering wheel and said vehicle steering device for driving said vehicle steering device relative to said grasping portion of the vehicle steering wheel such as to decrease the difference between said steering angle amount calculated in said steering amount calculating means and said current steering angle amount detected by said steering amount detecting means;

wherein said steering amount calculating means is arranged to operate said driving means in a direction to decrease a relative angle between the grasping portion of said steering wheel and said vehicle steering device in accordance with the displacement of said relative angle from a reference value of the relative angle.

16. A steering angle correcting system in a vehicle, comprising:

a steering amount detecting means for detecting a current steering angle amount based on a position of a grasping portion of a vehicle steering wheel;

a vehicle steering device for controlling a steering angle of steered wheels of the vehicle;

a position detecting means for detecting a relationship of a current position of the vehicle to a road lane on which the vehicle is traveling;

a steering amount calculating means for calculating a steering angle amount required to maintain an aimed relationship of the vehicle to the road lane based on the relationship of the current position of the vehicle to the road lane of the vehicle from an output from said position detecting means; and a driving means connected between said grasping portion of the vehicle steering wheel and said vehicle steering device for driving said vehicle steering device relative to said grasping portion of the vehicle steering wheel such as to decrease the difference between said steering angle amount calculated in said steering amount calculating means and said current steering angle amount detected by said steering amount detecting means;

wherein said driving means is operated in such a direction that said vehicle steering device is directed to a predetermined angle, when it is determined that the vehicle has changed the lane based on an output from said position detecting means.

* * * * *